United States Patent [19]

McCoy

[11] 3,999,113
[45] Dec. 21, 1976

[54] OVERCURRENT DETECTION APPARATUS FOR CONTROLLING POWER SUPPLIES
[75] Inventor: Daniel J. McCoy, Roanoke, Va.
[73] Assignee: General Electric Company, Salem, Va.
[22] Filed: Dec. 24, 1974
[21] Appl. No.: 536,285
[52] U.S. Cl. .................................. 321/12; 321/2; 323/9
[51] Int. Cl.² ...................................... H02H 7/122
[58] Field of Search ............ 321/2, 11, 12, 13, 14; 323/9, 20

[56] References Cited
UNITED STATES PATENTS

| 3,676,768 | 7/1972 | Morrey | 323/9 X |
| 3,859,586 | 1/1975 | Wadlington | 321/14 X |
| 3,873,282 | 3/1975 | Finch | 323/20 X |

*Primary Examiner*—A. D. Pellinen
*Attorney, Agent, or Firm*—Robert E. Brunson; Arnold E. Renner; Philip L. Schlamp

[57] ABSTRACT

A power supply system includes a plurality of power supplies having their outputs connected in parallel to provide a common voltage to an electrical load. Each power supply is self-regulating and capable of automatically turning off under power supply malfunction and overload conditions and turning back on after the condition is removed without affecting the operation of the other power supplies or interrupting the common voltage.

13 Claims, 19 Drawing Figures

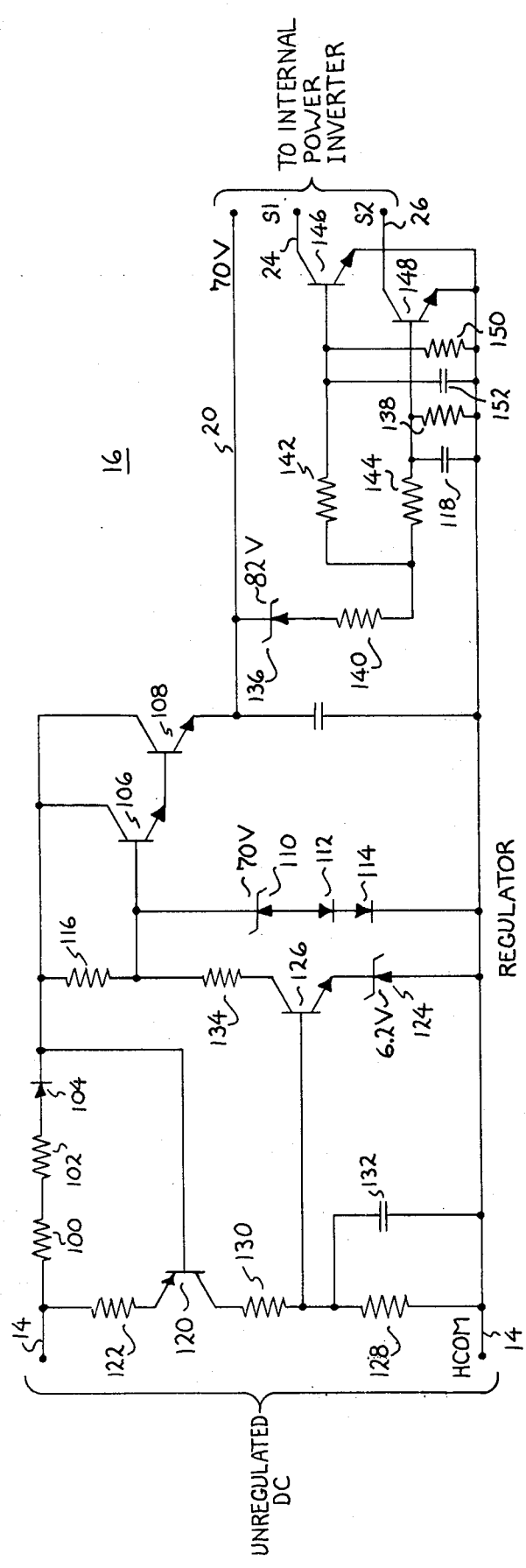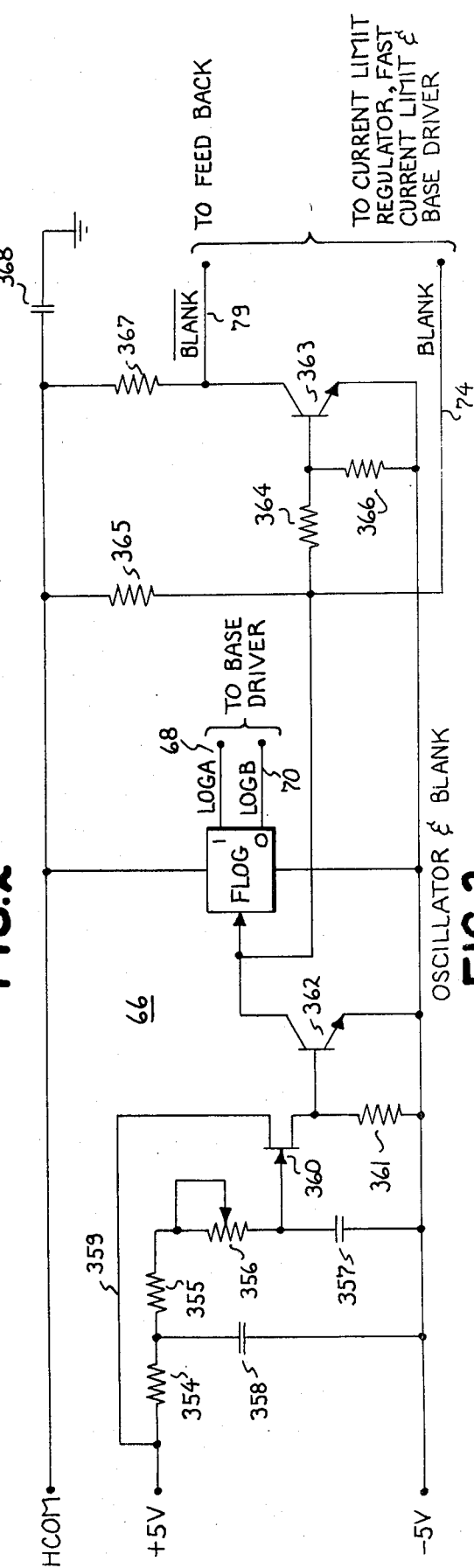
FIG.2
FIG.3

FIG. 4 FAST CURRENT LIMIT

FIG.6 FEEDBACK

HV LIMIT SHUT-OFF LATCH

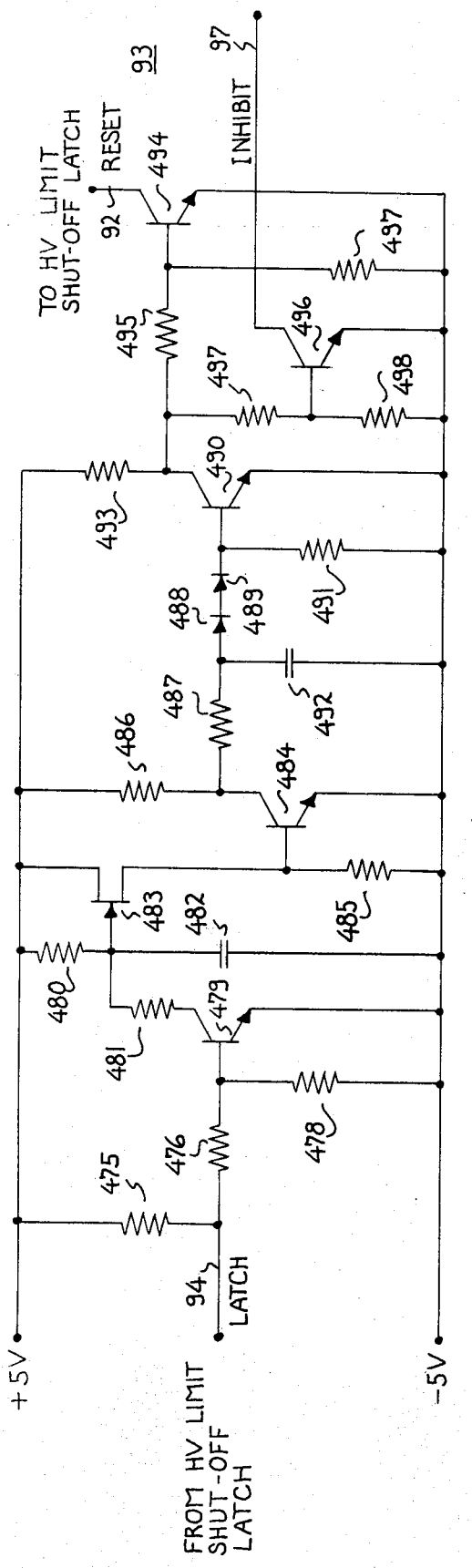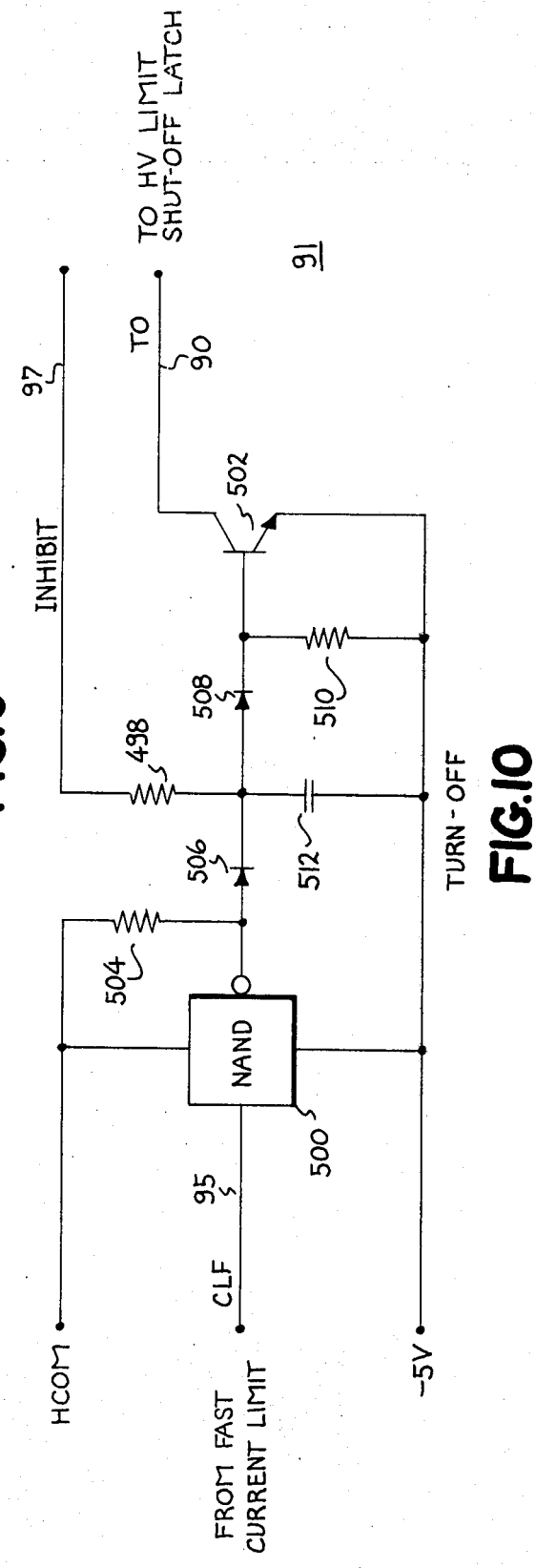

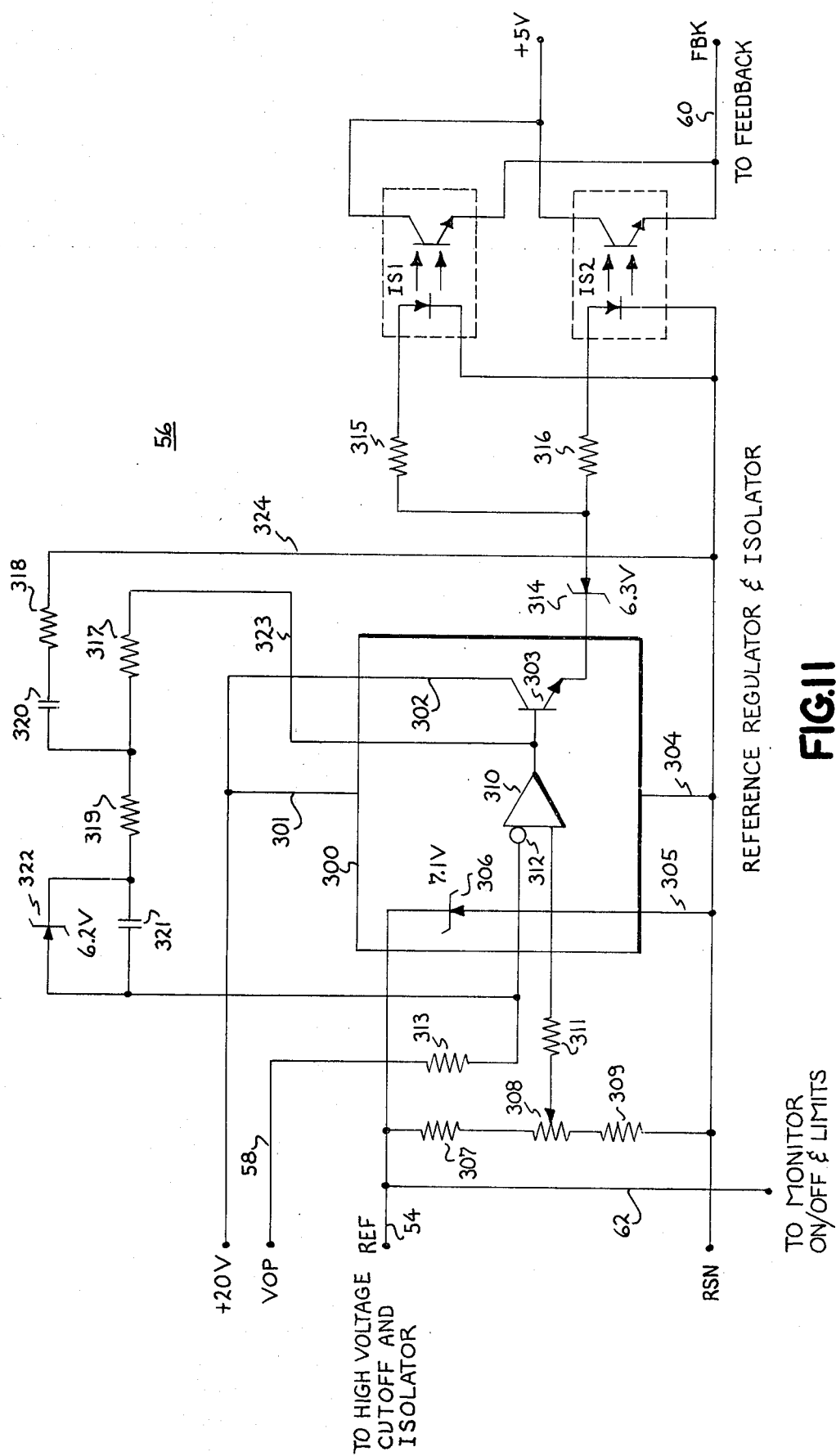
FIG.11 REFERENCE REGULATOR & ISOLATOR

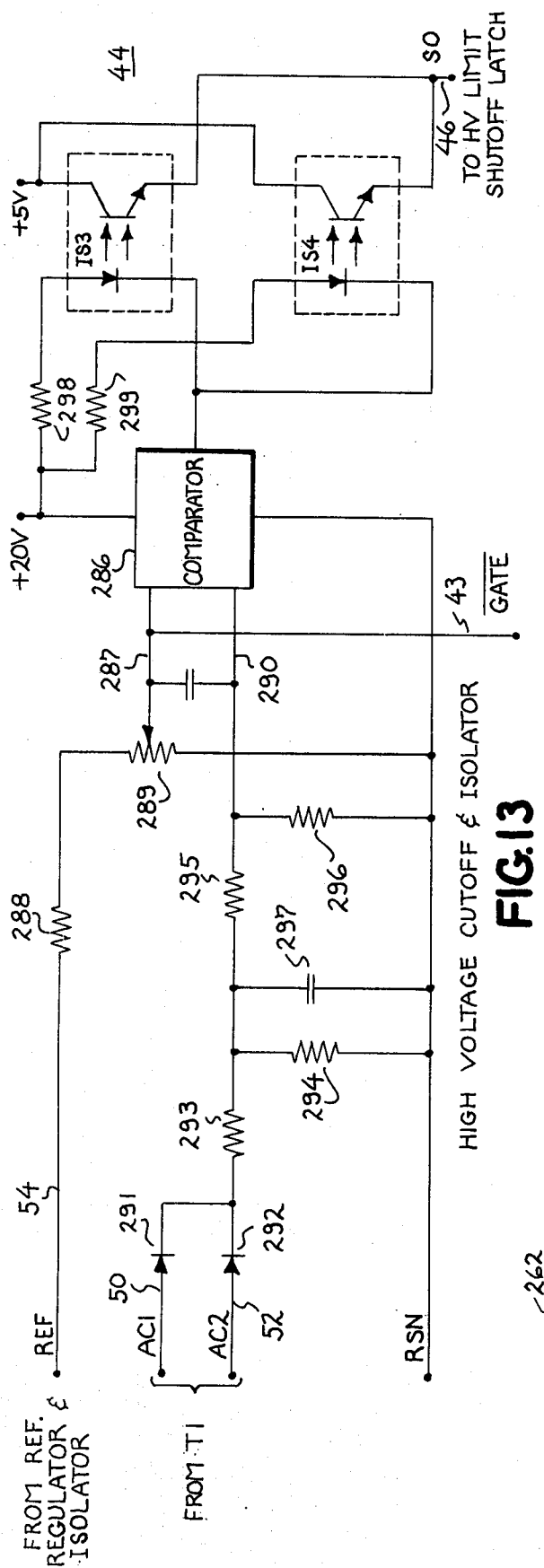
FIG.13 HIGH VOLTAGE CUTOFF & ISOLATOR
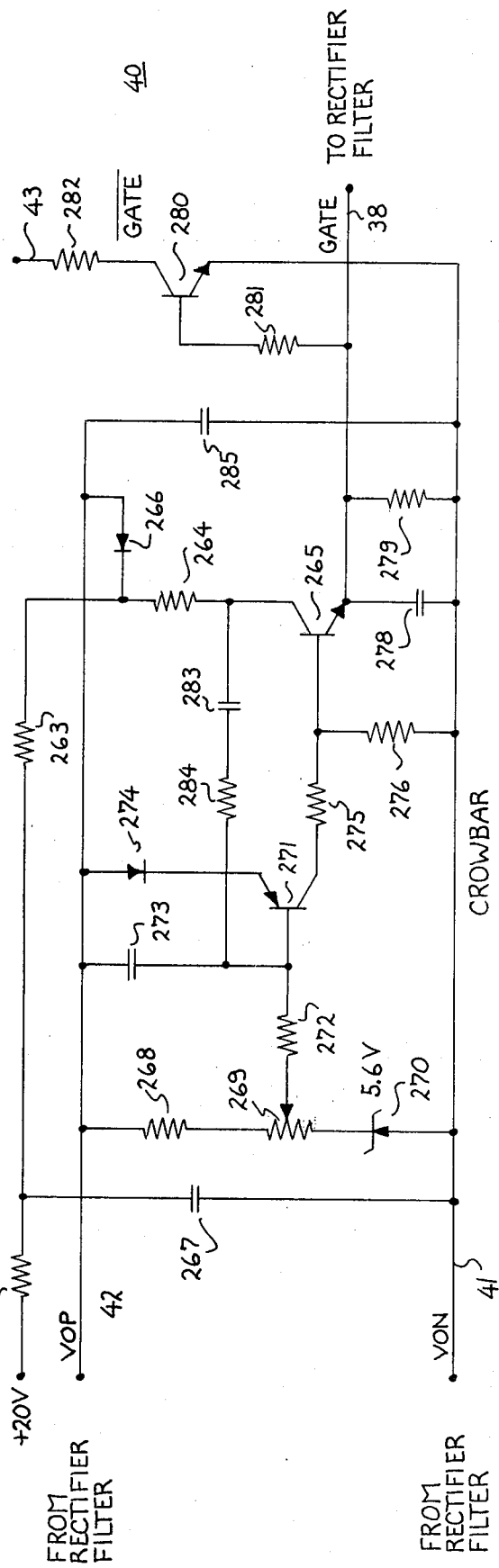
FIG.14 CROWBAR

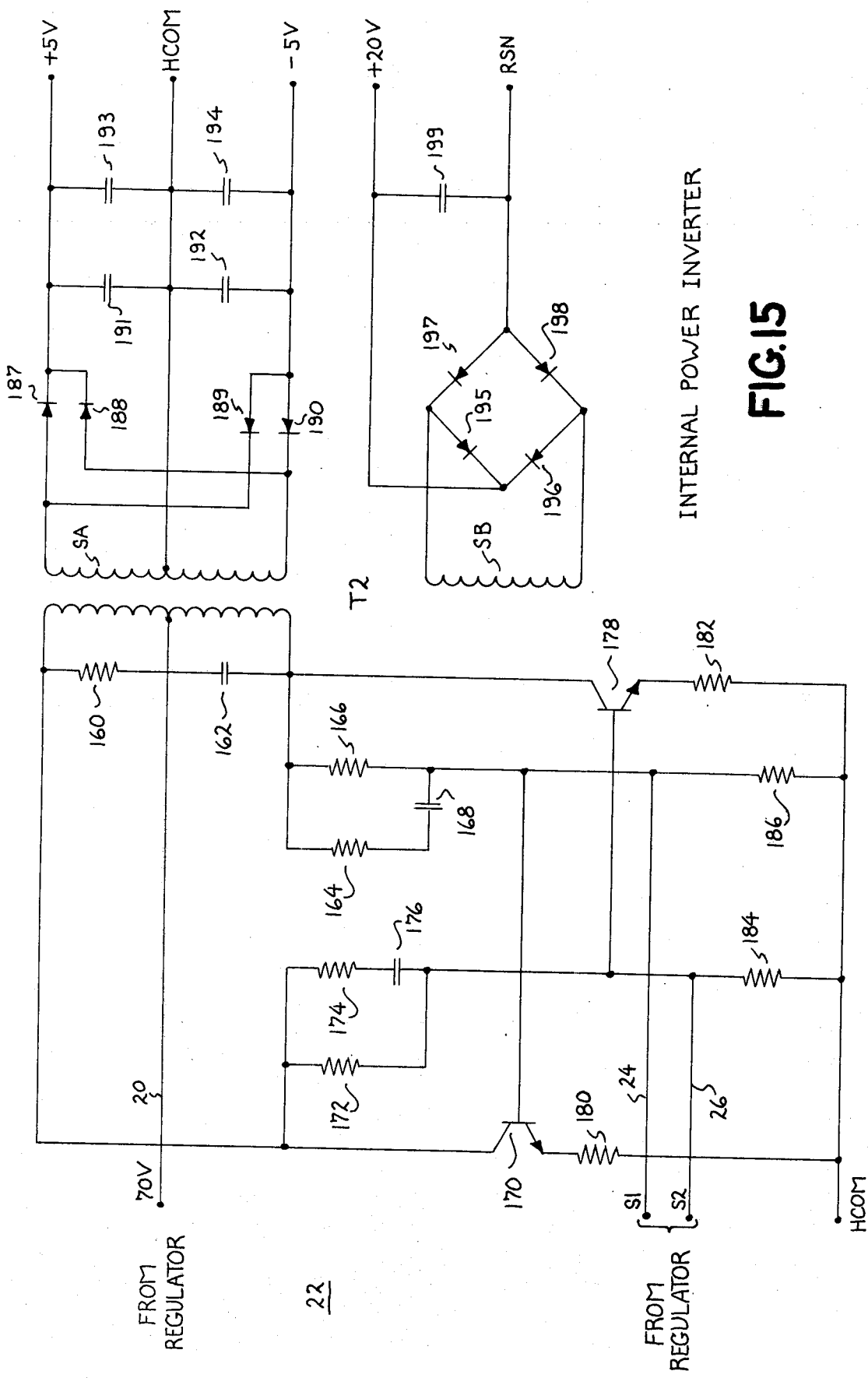
FIG.15 INTERNAL POWER INVERTER

FIG.17 RECTIFIER FILTER

OVERCURRENT DETECTION APPARATUS FOR CONTROLLING POWER SUPPLIES

BACKGROUND OF THE INVENTION

This invention relates primarily to power conversion systems of the inverter type and more particularly to overcurrent detection and control apparatus for controllable power inverters.

Controlled inverters have primary and secondary circuits. The primary circuit includes switching means responsive to pulsating control signals for controlling the switching or primary circuit current. Power from the primary circuit is coupled to a secondary circuit of the inverter where it is rectified and filtered to provide output voltage to an electrical load.

It is well known in the art that excessive currents in an inverter can cause irregularities in the output voltage and, if sustained, can seriously damage the inverter.

It is customary to sense the output voltage or current of the inverter and permanently shut the inverter (power supply) off if current becomes excessive. After the power supply has been shut-off it must manually be turned back on.

There are many applications for power supplies where an attendant operator is not economically practical. Further, many times, excessive inverter currents are only temporary in nature (e.g. temporary overload). In view of these temporary interruptions it is desirable to provide automatic apparatus for a power supply capable of automatic overcurrent detection, shut-off and turn on, not requiring operator intervention.

SUMMARY OF THE INVENTION

The aforementioned disadvantages are overcome by the present invention by providing a power supply including a controllable inverter for supplying controlled power to an electrical load. The inverter includes a primary circuit connectable to a source and is responsive to pulsating drive signals for controlling the percentage of time that the primary circuit is connected to the source to control periods of current flow through the primary circuit. Output power is taken from a secondary circuit of the inverter in response to power coupled thereto from the primary circuit.

Limit means is provided for substantially instantaneously generating a first current limiting signal having a pulse duration substantially equal to the time that the value of the primary circuit current is greater than a predetermined value.

Means is provided to effect an instantaneous inhibiting of the connection of the primary circuit to the source to turn the inverter off when the first current limiting signal exceeds the predetermined value.

An additional means is provided to generate a second inhibiting signal when the time integral of the first current limiting signal reaches a defined value to also effect an inhibiting of the connection of the primary circuit to the source for a first specified period of time when the first current limiting signal exceeds the predetermined value.

The generation of the second current limiting signal results in repetitively attempting to turn the inverter back on so long as the first inhibiting signal is being generated. When the first limiting signal disappears the inverter is automatically turned back on by the second current limiting signal.

It is therefore an object of the present invention to provide improved apparatus for protecting a power supply inverter when the inverter current exceeds a predetermined value.

It is a further object to provide apparatus for automatically turning an inverter off when the inverter current exceeds a predetermined value and for automatically turning the inverter back on when the current drops below the predetermined value.

Yet another object is to provide apparatus for monitoring maximum current limit in the primary circuit of an inverter to instantaneously turn the inverter off under intermittent and sustained current limit conditions and turn the inverter back on after a current limit condition is removed.

The foregoing and other objects and advantages of the present invention will become apparent as the description proceeds and the features of novelty which characterize the invention will be pointed out in particularity in the claims annexed to and forming a part of this specification.

DESCRIPTION OF THE DRAWINGS

While this specification terminates with claims specifically defining and setting forth what is considered to be the present invention, a clearer understanding thereof may be had from the following description taken in conjunction with the accompanying drawings in which:

FIG. 2 is a schematic of the Regulator 16 of FIG. 1.

FIG. 3 is a schematic of the Oscillator and Blank Circuit 66 of FIG. 1.

FIGS. 9 and 10 are schematics of the Start Up and Turn Off Circuits 93 and 91, respectively, of FIG. 1.

FIG. 11 is a schematic of the Reference Regulator and Isolator Circuit 56 of FIG. 1.

FIG. 13 is a schematic of the High Voltage Cutoff and Isolator Circuit 44 of FIG. 1.

FIG. 14 is a schematic of the Crowbar Circuit 40 of FIG. 1.

FIG. 15 is a schematic of the Internal Power Inverter Circuit 22 of FIG. 1.

DESCRIPTION OF THE PREFERRED EMBODIMENT

Figure 1:
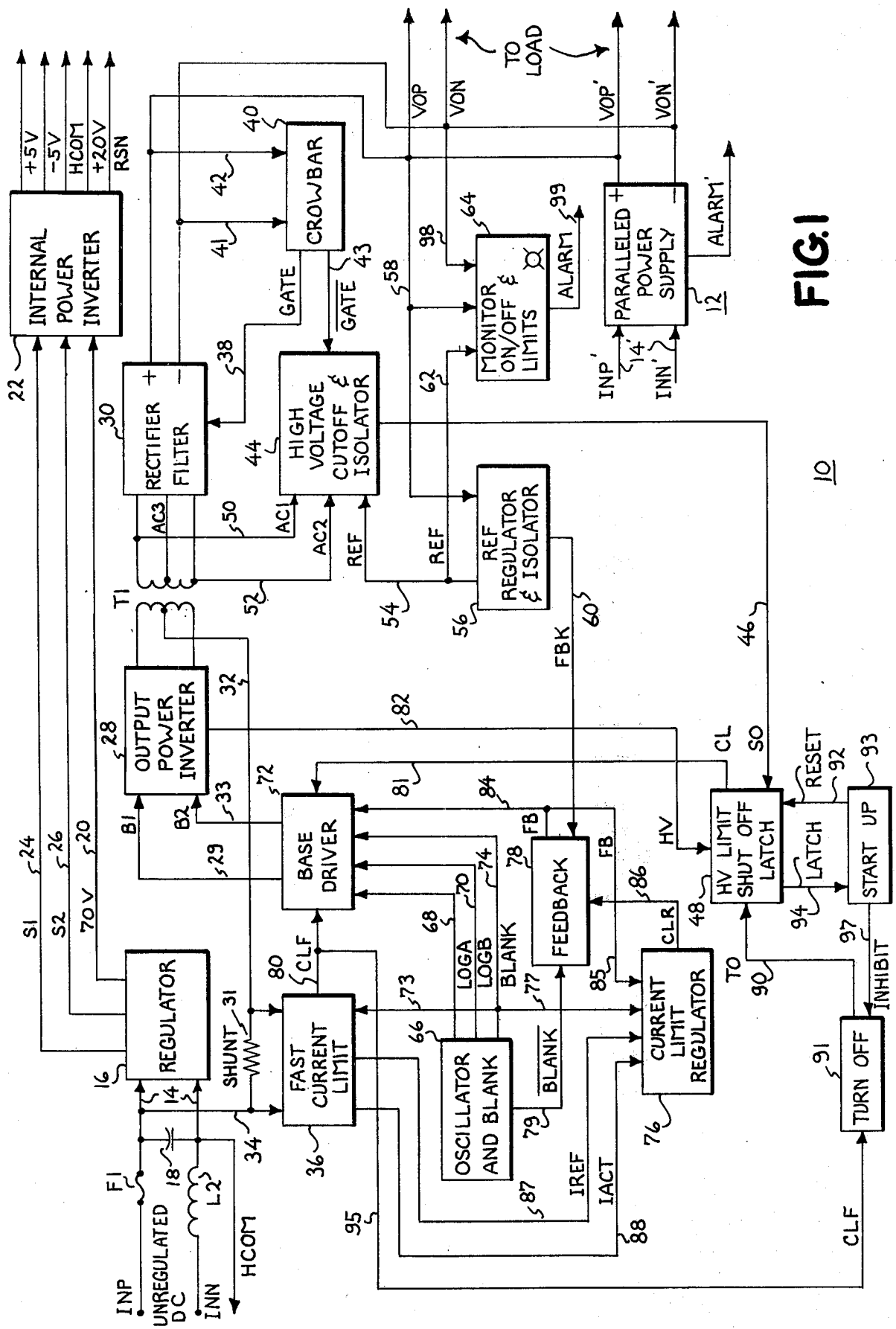
FIG. 1 is a major block diagram illustrating interrelationships between various circuits comprising a power supply system in accordance with the present invention.

Reference is now made to FIG. 1 which illustrates two basically similar power supplies 10 and 12. In FIG. 1 since both supplies are similar, only power supply 10 is illustrated in major block diagram form, it being understood that power supply 12, labeled Paralleled power supply, contains basically the same components and circuit structure of supply 10. It will be noted that each of the supplies have their respective positive (+) and negative (−) terminals connected together to form parallel power supplies to provide like voltages designated VOP, VON and VOP' VON' to an electrical load not shown. As will subsequently be described the structure and circuits of each power supply affords the advantage of being able to connect two or more of these types of power supplies in parallel to drive a common load merely by connecting their positive and negative terminals together as illustrated in FIG. 1. Paralleling of power supplies is highly desirable in situations where it is desirable to achieve high reliability. That is, if one power supply develops a malfunction necessitating its shut-off, the other power supply is capable of picking up the load and continuing to operate the electrical load.

Another advantage afforded by supplies 10 and 12 is that they are each capable of operating over a wide voltage range of unregulated DC power (e.g. 93–186 volt) from a bulk power supply not shown. Unregulated DC power is provided to the input terminals INP and INN, and INP' and INN' of the respective power supplies on conductors 14 and 14' as shown in FIG. 1. Both power supplies 10 and 12 may receive their unregulated bulk DC input from the same supply or they may each receive their input power from separate power supplies.

Reference is now made to the unregulated DC input terminals INP and INN of power supply 10. The INP, positive input terminal, and INN, negative input terminal, are connected to the unregulated DC voltage source to provide power through a fuse F1 and a choke or coil L2 to a regulator 16. A capacitor 18 is connected in parallel across conductors 14 and operates in conjunction with coil L2 as a noise suppression network attenuating inverter generated noise being reflected back int the unregulated DC source. It will also be noted that the INN terminal of conductors 14 serves as the common ground for the power supply and is designated as HCOM.

The primary purpose of regulator 16 is to provide a regulated voltage (e.g. 70 volts DC) on a conductor 20 to an internal power inverter 22. Additionally, the regulator 16 provides two output signals S1 and S2 on conductors 24 and 26 to inverter 22. These latter two signals, S1 and S2, are control signals for the internal power inverter 22 serving to control the turning on and off of that inverter in the event of an overvoltage condition in the regulator 16. Generally, the signals S1 and S2 function to turn the internal inverter off if the 70 volt output from the regulator 16 exceeds a specified value (e.g. 86 volts).

The internal power inverter 22, operating from the 70 volt DC input on conductor 20, is of a conventional saturating core type operating at a 5 kilohertz (kHz) rate. As previously mentioned this inverter is switch controlled by input signals S1 and S2 from the regulator 16 whereby it may be turned on and off under specified overvoltage conditions. The inverter 22 contains a conventional rectified output for providing +5 volts, −5 volts, and °20 volts to the various circuits comprising power supply 10. The common ground, HCOM, provides a common for the high voltage side of the power supply and also serves as a common ground for the + and −5 volts. The ground for the +20 volts output from inverter 22 is provided on a ground conductor designated RSN. In the ensuing description of the circuits comprising the power supply 10 these voltages are appropriately designated on each of the figures thereof.

Power supply 10 contains a second power inverter designated as an output inverter 28. This latter inverter is not of the saturating core type, but rather is a variable on time inverter which operates in the present embodiment at a 20 kHz rate in response to two input signals B1 and B2 on conductors 29 and 33 respectively. As will subsequently be described the presence of the B1 and B2 signals cause the output power inverter 28 to either operate in a cyclic mode or to turn the output power inverter off, thus killing the output from the power supply. Inverter 28 also includes a transformer T1 and a rectifier filter network 30. The primary winding of the transformer T1 is center tapped and connected in series through a resistive shunt 31 via conductors 32 and 34. As will subsequently be described in detail, the purpose of shunt 31 is to monitor the current flowing through the T1 primary. This monitoring is accomplished in a fast current limit circuit 36.

The rectifier filter receives AC input voltage on lines AC1, AC2 and AC3 from the secondary winding of transformer T1. The rectifier filter 30 is of the conventional type. The filter output is gate controlled by a GATE signal on conductor 38 from a crowbar circuit 40. When the GATE signal is present, the output voltage VOP from the filter is pulled down to a voltage of less than 2 volts. This occurs when the output voltage VOP across conductors 41 and 42 applied to a crowbar circuit 40 exceeds 7 volts. The crowbar circuit 40 also provides a signal GATE to a high voltage cutoff and isolator circuit 44. This latter signal is utilized to automatically shutoff the power supply whenever the output voltage VOP exceeds a predetermined value (for example, 7 volts).

The high voltage cutoff and isolator circuit 44 serves as a means to generate a shutoff signal SO on a conductor 46 to a high voltahe (HV) shutoff latch 48 to shut the power supply off under two different conditions. The first of these conditions is when the AC signals AC1 and AC2 on conductors 50 and 52 respectively from transformer T1 exceed the value of a reference voltage (REF) provided to the cutoff and isolator 44 on a conductor 54. The other of these two conditions, as previously described, is when the output voltage VOP on conductor 42 activates the crowbar circuit 40 to generate the GATE signal on conductor 43 to cause the high voltage cutoff and isolator circuit 44 to generate the SO signal on conductor 46.

A reference regulator and isolator 56 receives the output voltage VOP on a conductor 58. Regulator 56 generates two output signals, the previously mentioned voltage REF on conductor 54 and a feedback signal FBK on a conductor 60. The REF voltage is generated within the reference regulator and isolator 56, and as previously mentioned, is utilized by the high voltage cutoff and isolator circuit 44 to detect an overvoltage condition from AC1 and AC2. The REF voltage is also supplied via a conductor 62 to a monitor on/off and limits circuit 64. The feedback signal FBK on conductor 60 is utilized in the power supply to control the output power from inverter 28. The manner in which the output power converter 28 is controlled by the FBK signal will subsequently be described.

Reference is now made to an oscillator and blank circuit 66 of FIG. 1. This circuit serves primarily to determine the output power inverter frequency by operating as a basic clock signal generator to generate four output signals LOGA, LOGB, BLANK and BLANK. The two output signals LOGA and LOGB are alternating logic signals always having opposite senses and are provided on conductors 68 and 70 to a base driver circuit 72. These two signals, LOGA and LOGB, via the base driver circuit, serve as basic steering signals for the output power inverter. The timing or BLANK signal is provided to three circuits, the fast current limit circuit 36 on a conductor 73, the base driver circuit 72 on a conductor 74, and to a current limit regulator circuit 76 on a conductor 77. The fourth signal BLANK is provided to a feedback circuit 78 via a conductor 79.

The base driver circuit 72 serves primarily as a switchable current or voltage source for controlling the operation of the output power inverter 28 in response to the B1 and B2 signals on conductors 29 and 33. The base driver circuit 72 responds to a fast current limit signal CLF on a conductor 80 from the fast current limit circuit 36 to turn off the power inverter 28 when the current in the primary winding of the transformer T1 exceeds a predetermined value. Also, the base driver 72 receives a current limit signal CL on a conductor 81 from the high voltage limit shutoff latch circuit 48. The base driver circuit 72 also responds to this signal to turn off the inverter if the voltage appearing across the transistors which drive the output power inverter exceeds a predetermined value. A high voltage signal HV is provided from the power inverter 28 to the shutoff latch 48 via a conductor 82. The purpose of the HV signal will subsequently be described. As previously mentioned, the base driver circuit 72 responds to the LOGA, LOGB, and BLANK signals under normal operating conditions to drive the output power converter 28 at the secified frequency of 20 kHz.

Referring now to the feedback circuit 78, that circuit, serving as a voltage regulator, provides a second feedback signal FB on a conductor 84 to the base driver 72. This latter signal FB is also provided to the current limit regulator 76 on conductor 85. The feedback circuit 78 responds to three input signals, the BLANK signal on conductor 79, the feedback signal FBK on conductor 60 and a current limit regulator signal CLR on conductor 86. The two input signals CLR and FBK are variable signals, the magnitudes of which selectively determine the pulse width of the FB signal to control the output power inverter on and off times via the base driver circuit 72. The pulse width of the FB signal on conductor 84 controls the pulse width of the B1 and B2 signals, thus causing the output power inverter to function as a pulse width modulated inverter. In this manner it is possible to control the output power of the inverter 28 by controlling its on and off times.

The current limit regulator 76 is an important adjunct of the power supply 10 of FIG. 1. The output voltage VOP and the output current are normally controlled from minimum to the maximum current via the feedback voltage regulator circuit 78 in response to the FBK signal on conductor 60. However, beyond the maximum current value (e.g. 50 amperes) the current limit regulator 76, providing the CLR signal to the feedback circuit 78, will cause the output current of the power supply to remain nearly constant and allow the output voltage VOP to decrease with increasing load conditions. This is accomplished by the current limit regulator circuit 76 which responds to the FB signal and a current reference signal or voltage IREF on conductor 87 and an actual transformer primary current or voltage IACT on conductor 88. Additionally, the BLANK signal on conductor 77 is fed to the current limit regulator. The FB and BLANK signals are utilized by the limit regulator to time the generation of the CLR signal. The IREF and IACT signals fromm the fast current limit circuit are compared in an integrator in the current limit regulator. So long as the IREF signal is higher than the IACT signal the CLR signal basically has no effect on the operation of the feedback circuit 78. However, if the magnitude of the IACT signal exceeds the magnitude of the IREF signl the CLR signal goes active changing in value in such a manner to cause the feedback circuit 78 to alter the FB signal. This altering of the FB signal causes a change in pulse widths of the B1 and B2 signals in such a manner that the output voltage is decreased while the power supply transformer and rectifier filter current are held approximately equal to the value of the IREF signal.

Reference is now made to the high voltage limit shutoff latch circuit 48. This circuit serves primarily to shutoff the power supply in the event that there is an overvoltage condition in the power driver transistors in the output power inverter, or if a high voltage condition is detected by the high voltage cutoff and isolator circuit 44. The high voltage limit shutoff latch circuit will shut the power supply off by the activation of the CL signal on conductor 81 to the base driver circuit 72. The shutoff latch circuit 48 will also turn the power supply off in response to a turn off signal TO on conductor 90 from a turnoff circuit 91 or from a reset signal on a conductor 92 from a startup circuit 93. The shutoff latch circuit 48 also provides a latch signal on a conductor 94 to the start up circuit 93 to control the latter circuit during power supply start up operation and during power supply overload, overvoltage or overcurrent conditions.

The turnoff circuit 91 serves to generate the TO signal on conductor 90 to turn the power supply off in response to the CLF signal on conductor 95 from the fast current limit circuit 36. There is a slight delay between the application of the CLF signal and the generation of the TO signal due to integration of the latter signal. If the CLF signal is, for example, present at the input of the turnoff circuit for approximately 20 milliseconds, the turnoff signal TO is generated which in turn activates the high voltage limit shutoff latch 48 causing the power supply to turnoff and to simultaneously generate the LATCH signal on conductor 94 to initiate a startup of the power supply.

The startup circuit 93, inconjunction with the state of the shutoff latch 48, determines whether the output voltage VOP is present when power is first applied to the power supply. If the power supply comes up in the off state the LATCH signal on conductor 94 will cause the startup circuit to generate a RESET signal on conductor 92 to the shutoff latch 48 and an INHIBIT signal on conductor 97 to the turnoff circuit 91. The INHIBIT signal prevents the generation of the TO signal so that it cannot change the state of the shutoff latch. With the CL signal absent the base driver circuit 72 can begin to supply the B1 and B2 signals to the output power inverter 28. In this manner the power supply is brought on line to generate the output voltage VOP.

The last circuit to be described in FIG. 1 is the monitor on/off and limits circuit 64. This circuit receives the REF reference voltage on conductor 62, the VOP output voltage on conductor 58 and the output ground VON from the rectifier filter 30 on a conductor 98. The primary purpose of the monitor on/off limits circuit is to monitor the output voltage VOP and compare that voltage against the REF voltage to see if VOP is within prescribed limits (for example, between 5.25 volts and 4.75 volts). The monitor on/off and limits 64 contains a novel circuit in that it comprises an indicator light such as a light emitting diode (LED) which, unlike previous power supplies, indicates that power is not only applied to the power supply but the power supply is also operating within limits. If the power supply goes out of limits the indicator light will be extinguished and simultaneously the circuit will generate an ALARM signal on the conductor 99 to sound an alarm connected externally of the power supply and to a current source not shown. Thus it can be seen that the indicator light in the monitor on/off limit circuit is a dual purpose light. That is, it indicates that power is applied to the power supply and also that the power supply is either in or out of limits depending upon whether the light is on or off.

In the ensuing description, each of the circuits and their operation as shown in block diagram form in FIG. 1 and as depicted in schematic form by FIGS. 2 through 17 will be individually described. Subsequent to the descriptions of those figures the overall operation of the power supply will then be described with reference to the timing diagram of FIGS. 18 and 19.

Reference is now made to FIG. 2 to the regulator circuit 16 which receives the unregulated bulk DC input voltage at conductors 14 as previously described in connection with FIG. 1. Regulator 16 serves primarily as a series regulator having a short time current limit capability for providing the regulated 70 volt output on conductor 20 to the internal power converter 22. Further, regulator 16 includes circuitry for generating the S1 and S2 signals to shut down inverter 22. This shutdown feature provides output overvoltage protection for the external load in the event of a regulator short or failure. As previously mentioned, signals S1 and S2 control the internal power inverter 22 to shut that inverter down in the event of a malfunction in the regulator. It will be recalled, as previously described, that the input voltage on conductors 14 can cover a wide range of voltages. For example, 93 volts DC to 186 volts DC. The manner in which the regulator 16 can handle this wide range of input voltages will become understood as the description proceeds.

The main current flow through regulator 16 is through two resistors 100 and 102, diode 104 and through the collector emitter circuits of two transistors 106 and 108 connected in Darlington configuration. The regulated 70 volts output is taken from the emitter of transistor 108 and provided to the internal power inverter 22.

The nominal 70 volt output voltage on conductor 20 is determined by series connected 70 volt diode 110, diodes 112, 114 and a bias resistor 116. The cathode of zener diode 110 is connected to the base of transistor 106. Zener diode 110 provides a regulated 70 volts at the base of transistor 106. Thus it can be seen that the Darlington connected transistors 106 and 108 conduct under the control of the 70 volt reference voltage to maintain the output voltage on conductor 20 at 70 volts.

The series connected resistors 100 and 102 and diode 104 are connected in shunt through a resistor 122 with the emitter base circuit of a transistor 120. During operation of the regulator, when the output current on conductor 20 exceeds a predetermined value (e.g. 170 milliamps) the voltage drop at the base of PNP transistor 120 causes that transistor to conduct sufficiently to develop more than 6.2 volts across a resistor 128 forming part of a voltage divider network comprising a series connected resistor 130 connected to the collector of transistor 120. A capacitor 132 connected between HCOM and the junction of resistors 128 and 130 serves merely as a bypass capacitor to eliminate noise from affecting the operation of transistor 126. As current increases through transistor 120 the base of transistor 126 will go positive causing that transistor to turn on. With transistor 126 turned on its collector voltage will drop, thus causing the voltage at the junction of the voltage divider formed by resistors 116 and 134 to go sufficiently negative to reverse bias the Darlington transistors 106 and 108 turning them off. This results in a collapse of the 70 volts on conductor 20.

The reason for incorporating this current limiting feature in the regulator of FIG. 2 is to avoid destruction of the regulator circuitry which may be caused by momentary shorts in common (HCOM). If either of the transistors 106 or 108 develops a collector to emitter short the output voltage (70 volts) will immediately jump relatively close to the input voltage (in the example 93 to 186 volts). The conduction of diode 136 is effected by the voltage increasing at the junction of resistor 140 where it connects to two resistors 142 and 144 connected to the bases of transistors 146 and 148 respectively. This positive going voltage at the junction of resistors 140, 142, and 144 causes current to flow through the emitter base circuit of each of the transistors 146 and 148, thus turing those trasistors on. With transistors 146 and 148 on their collectors go to binary 0 sending the disable signals S1 and S2 to the power inverter 22. Resistors 138 and 150 and capacitors 118 and 152 are connected from the bases of their respective transistors 146 and 148 to HCOM. It is important to shutdown the internal inverter 22 in the event of a shorting situation as just described because the output of the power inverter 22 provides ±5 volts and +20 volts to the various circuits within the power supply. In the preferred embodiment, these power supplies utilize integrated circuit chips (e.g. TTL) which are susceptible to damage if there input voltages exceed 7 volts.

Reference is now made to FIG. 15 which illustrates an electrical schematic of the internal power inverter 22. As previously mentioned the power inverter 22 is a conventional saturating core type inverter which in the preferred embodiment operates at 5 kHz. This inverter operates from the regulated 70 volts applied on conductor 20 from the regulator 16 to the center tap of the primary winding of the transformer T2. The transformer primary circuit is comprised of a series connected resistor 160 and capacitor 162, connected in parallel across the primary winding of transformer T2. Two parallel connected resistors 164 and 166 are connected at one end of the primary of transformer T2. A capacitor 168 is connected to the other end of resistors 164 and 166. Resistor 166 is connected to the base input circuit of a transistor 170. A similar connection to resistors 164, 166 and capacitor 168 is comprised of resistors 172 and 174 and capacitor 176. These two resistors are connected to the opposite end of the primary of transformer T2. Capacitor 176 and the resistor 172 is a similar fashion to resistors 166 and capacitor 168 are connected to the base input circuit of a transistor 178.

Emitter bias resistors 180 and 182 are provided for transistors 170 and 178 respectively. These latter two resistors are connected to ground terminal or bus HCOM. Additionally, a base bias resistor 184 is connected from HCOM to the base input of transistor 178 and to one end of resistor 172 and capacitor 176. In a similar fashion, a base bias resistor 186 is connected from HCOM to the base of transistor 170 and to resistor 166 and capacitor 168.

The two switching signals S1 and S2 on conductors 24 and 26 respectively from the regulator 16 are provided to the base inputs of transistors 170 and 178 respectively. When these two signals are not present the inverter is capable of operating in normal mode. That is, it functions as an oscillator at a 5 kHz rate to generate an alternating output voltage for coupling to the secondary of transformer T2. However, it can be seen if the S1 and S2 signals are clampled to ground potential (binary 0) by the conduction of transistors 146 and 148 of FIG. 2 neither of the transistors 170 or 178 can conduct. Whe these two transistors are prevented from conducting the inverter cannot oscillate, and the output voltage of ±5 volts and +20 volts will be inactivated.

The secondary portion of the internal power inverter of FIG. 15 is comprised of two isolated output windings designated SA and SB. Secondary winding SA is a center tap winding comprising the common ground (HCOM) of the power. The two ends of the secondary winding SA are fed through conventional rectifiers comprised of diodes 187, 188, 189, and 190. Conventional filtering is provided by four capacitors 191, 192, 193, and 194 connected from the ±5 volt lines to HCOM. The second secondary winding SB provides an electrically isolated output voltage of +20 volts through a bridge rectifier comprised of diodes 195, 196, 197 and 198.

The 20 volt output voltage is filtered by a capacitor 199 connected between +20 volt lead and the 20 volt ground RSN. RSN is taken from the junction at the anodes of diodes 197 and 198 whereas the +20 volts is taken off the cathode junction of diodes 195 and 196. In normal operation of the power supply the ±5 volts and the +20 volts are constantly supplying bias voltages to the various circuits of the power supply. However, in the event of a malfunction in the regulator 16 the two signals S1 and S2 will clamp the bases of each of the transistors 170 and 178 to ground potential (HCOM) thus preventing those two transistors from conducting. This action will turn off the inverter removing the output voltages. It is in this manner that the various transistors and integrated circuits are protected in the circuits which make up the power supply.

Figure 16:
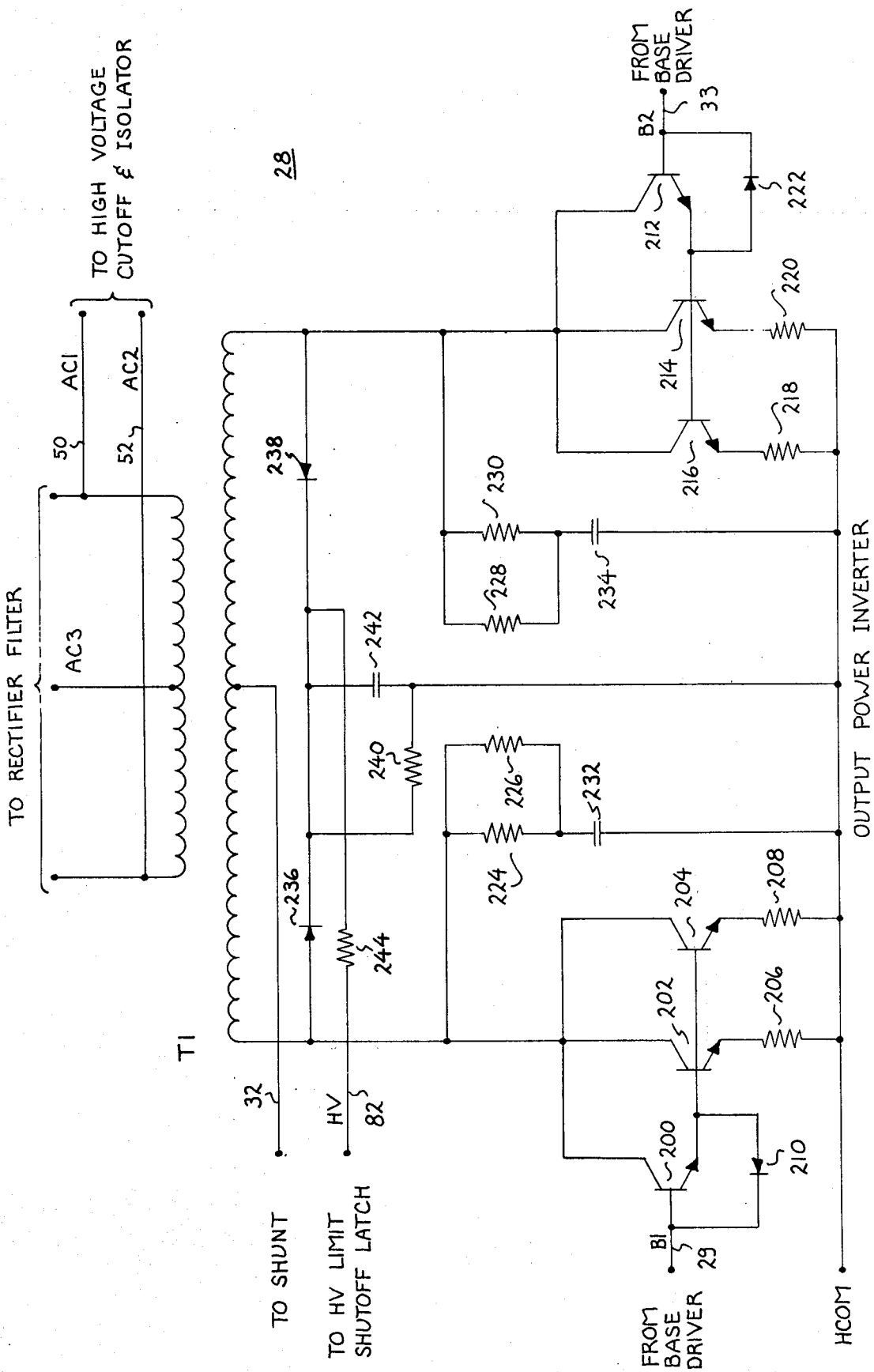
FIG. 16 is a schematic of the Output Power Inverter Circuit 28 of FIG. 1.
Figure 18:
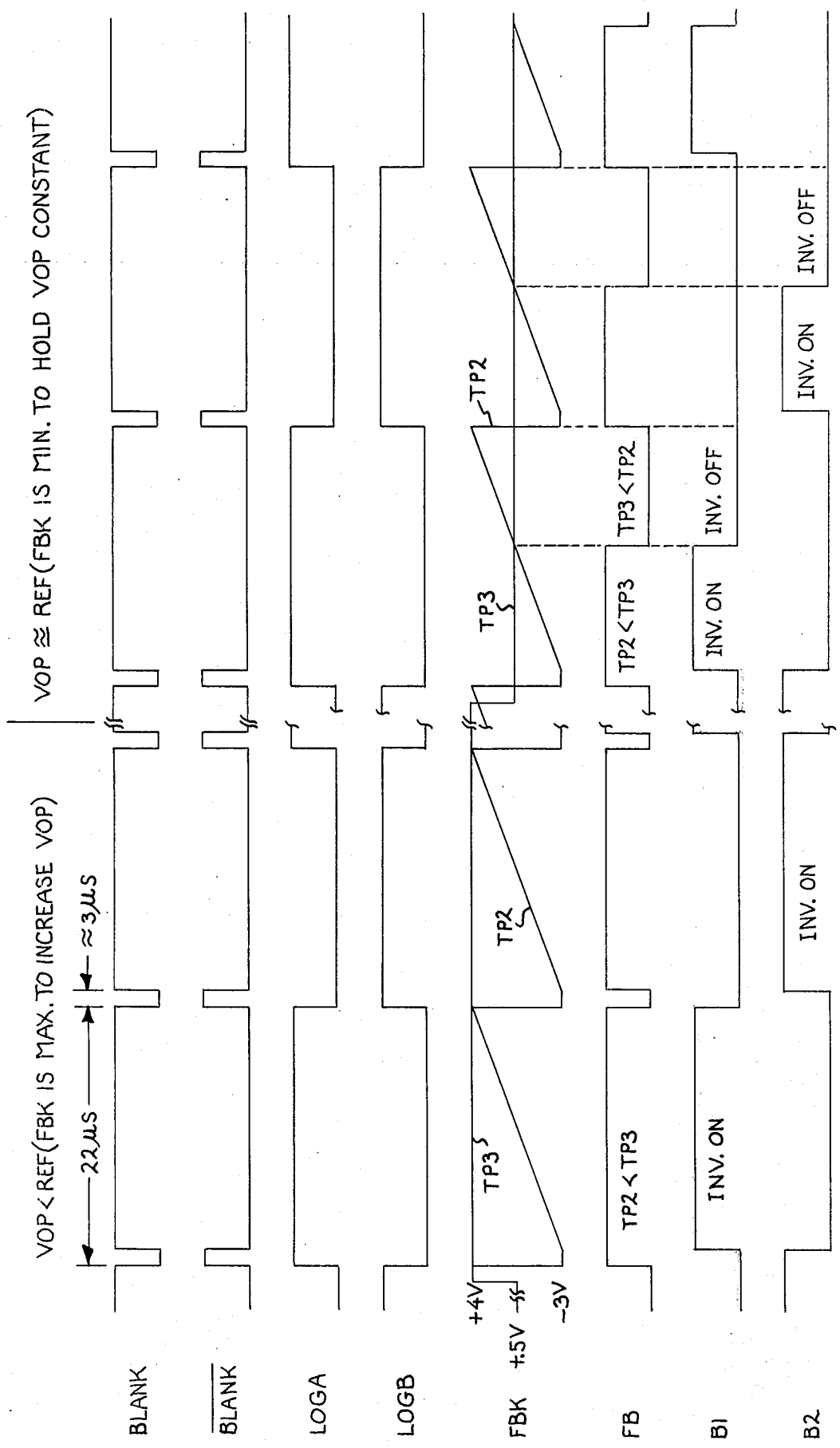
FIGS. 18 and 19 are timing diagrams showing the interrelationships between major signals flowing between the various circuits of the power supply and are useful in understanding the operation of the invention.
Figure 19:
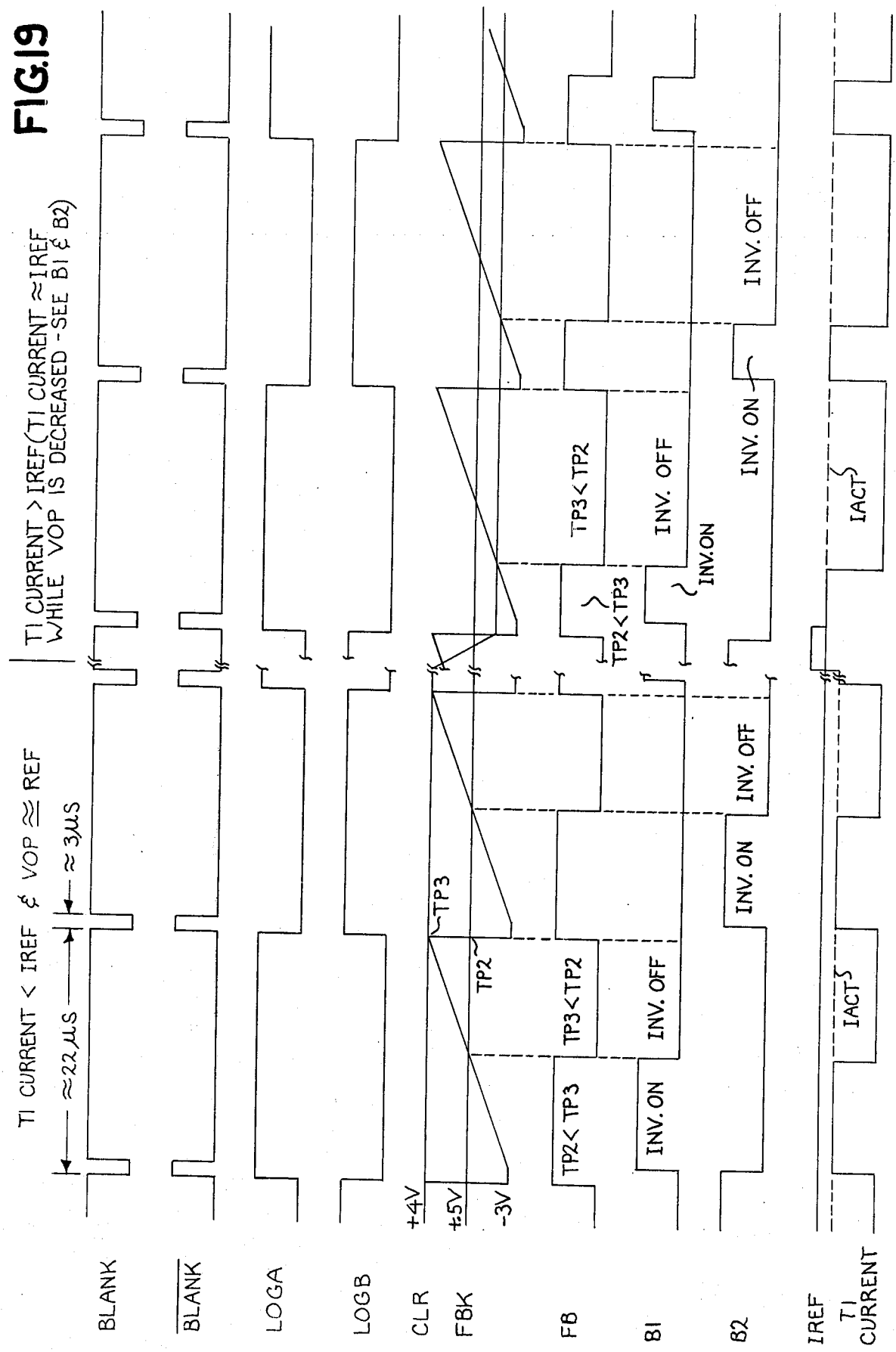

Reference is now made to FIG. 16 which illustrates in schematic form the output power inverter 28. As previously mentioned the output power inverter 28 is capable of operating as a pulse width modulated inverter by the two input signals B1 and B2 from the base driver circuit 72 of FIG. 1. These two signals are illustrated in FIGS. 18 and 19, which show the generation of these signals under varying operating conditions of the power supply. It is significant to note that the B1 and B2 signals are never both high or positive simultaneously. However, both of these signals may be in low or down position at the same time. This implies that there are basically three states of operation for the output inverter. This is explained as follows. If the B1 signal on conductor 29 is positive, three inverter power transistors 200, 202, and 204 are turned on. This is effected by the positive input voltage INP flowing through the shunt 31 of FIG. 1, through the T1 transformer primary to the collector electrodes of each of the transistors 200, 202, and 204. The emitters of transistors 202 and 204 are connected to HCOM through their respective bias resistors 206 and 208. A diode 210 connected in shunt between the emitter and base of transistor 200 serves to decrease the turn off times of transistors 202 and 204. By referring to FIG. 18 or 19 it can be seen that when the B1 signal is high the B2 signal is low. Under this condition power driver transistors 212, 214 and 216 receiving the negative or low B2 signal are turned off. Resistors 218 and 200 serve the same purpose as previously described for resistors 206 and 208. Likewise, as previously described for diode 210, a diode 22 is connected from the emitter to base of transistor 212 and serves the same purpose as diode 210. Again referring to FIGS. 18 or 19 it can be seen that when the B1 signal for the left portion of the ouput inverter goes low its corresponding transistors 200, 202, and 204 will be turned off and transistors 212, 214 and 216 associated with the right hand portion of the power inverter receiving B2 wll be turned on. Further as can be seen in the timing diagram, if B1 and B2 are both low their corresponding transistors in the output power inverter are turned off.

Each half of the output power inverter is comprised of an RC network including two parallel connected resistors, such as resistors 224, 226, 228 and 230 connected at one end to their corresponding collectors of transistors 200, 204, 212, 214, and 216 respectively. Further, each pair of these parallel connected resistors are connected to HCOM through a corresponding one of capacitors 232 and 234. The primary purpose of these RC networks are to suppress voltage transients produced by transformer T1 inductance or the inductance normally created by the transformer load on the secondary from affecting the operation of the power drive transistors.

An important feature to the operation of the power supply of the present embodiment and to the ouput power inverter of FIG. 16 is the high voltage (HV) output on conductor 82. This conductor is connected to the cathode junction of two diodes 236 and 238, each having their anodes connected to opposite ends of the T1 primary winding. Also connected to the cathode junction of diodes 236 and 238 is a resistor 240 in parallel with a capacitor 242. Resistor 240 and capacitor 242 are also connected to the common ground HCOM. These two diodes function basically as rectifiers in the primary circuit of the inverter. When capacitor 242 is not fully charged, these two diodes function to provide a path for peak inductive load current reflected back into the T1 primary when each of the respective transistors in each half of the inverter are turned off. For example, let it be assumed that the transistors receiving the B1 signal are instantaneously turned off while simultaneously the B2 transistors are turned on. With this assumption transistors 212, 214 and 216 will conduct causing the anode of diode 238 to go basically to ground potential, thus reverse biasing that diode. However, transistors 200, 202 and 204 going instantaneously to the off condition will cause the voltage of the anode of diode 236 to rise to a high positive potential in accordance with the amplitude of the input voltage applied on conductor 32 supplemented by the inductive feedback voltage reflected into the primary.

Assuming that capacitor 242 is presently not fully charged the diode will thus conduct to ground through capacitor 242 causing it to charge to that value of the anode voltage of diode 236. In this manner transient voltages are prevented from affecting the operation of transistors 200, 202 and 204 thus protecting those transistors against surge current. The inverse can be said if it is assumed that the transistors receiving the B1 signal are turned on and those transistors receiving the B2 signal are turned off. It can be seen that capacitor 242 always charges in the same direction, that is from a negative to positive direction.

The voltage to which capacitor 242 charges is a function of the switching on and off times of the left and right portions of the power inverter 16. For example, the longer that the transistors receiving the signal B1 are in the off state the longer capacitor 242 has to charge to the peak voltage applied to the capacitor through diode 236. Likewise if the transistors in the right portion of the inverter receiving the B2 signal are in the off state capacitor 242 will charge through diode 238. Obviously, if the transistors in both halves of the inverter of FIG. 16 are in the off state there can be no peak inductive load current reflected into the transformer primary, thus capacitor 242 will never charge to any voltage higher than the input voltage on conductor 32. However, during operation of the inverter, if capacitor 242 charges to an excessive voltage (e.g. 480 volts) that voltage will appear on the high voltage lead HV 82 through a current resistor 244. As previously described the HV signal on conductor 82 is provided to the high voltage limit shutoff latch circuit 48. As will subsequently be described, when this voltage goes to a predetermined level the high voltage limit shutoff latch is activated to cause the power supply to be shutdown. It is also significant to note that the resistor 240 in parallel with capacitor 242 of FIG. 16 is utilized to control the discharge time of capacitor 242 during intervals that the inverter is in the off state (i.e. when the B1 and B2 signals are both low). Thus, it can be seen if the B1 and B2 signals alternate too closely together and if inductive feedback is excessive, capacitor 242 will not have time to sufficiently discharge to a predetermined level to hold that level within the limits to prevent the power supply from shutting down. Proper spacing between the B1 and B2 signals without excessive inductive feedback will prevent capacitor 242 from every charging to an unsafe level. However, should it exceed the safe level, it is essential to shut the power supply down in order to protect the power driver transistors in the output power inverter of FIG. 16. The secondary winding of the T1 transformer of FIG. 16 provides signals AC1, AC2, and AC3 to the rectifier filter circuit 30 of FIG. 17.

Figure 17:
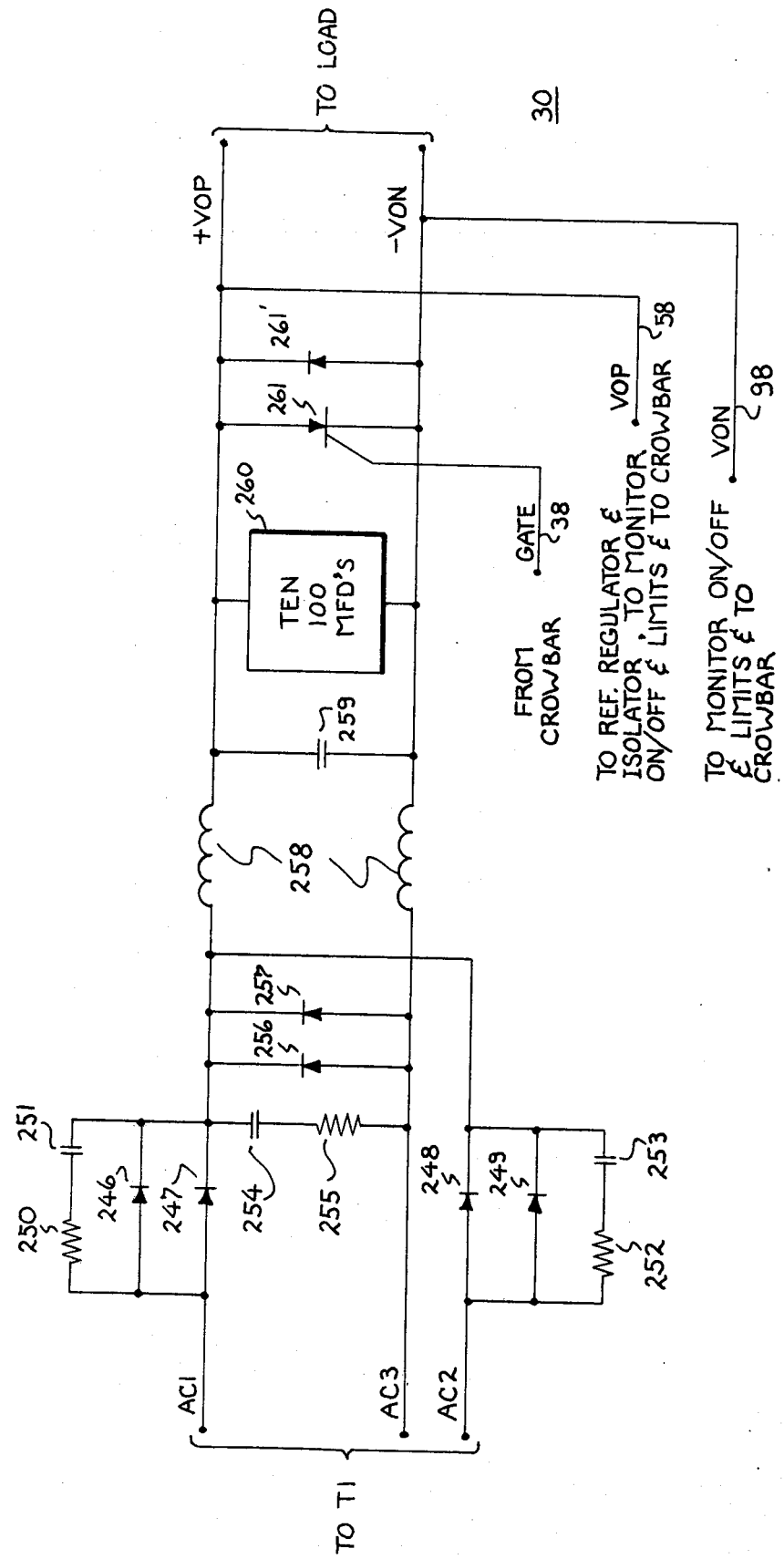
FIG. 17 is a schematic of the Rectifier Filter Circuit 30 of FIG. 1.

Reference is now made to FIG. 17 which is a conventional rectifier filter circuit receiving the input voltages AC1, AC2, and AC3 from the secondary winding of transformer T1. The circuit is comprised of conventional diode rectifiers 246, 247, 248, and 249. Rectifiers 246 and 247 are connected in parallel with the AC1 line. Rectifiers 248 and 249 are likewise parallel connected to the A2 line. A resistor 250 and a capacitor 251 are connected in series and in turn connected in parallel across diodes 246 and 247. In a similar fashion series resistor 252 and capacitor 253 are connected in parallel across diodes 248 and 249. A conventional series connected capacitor 254 and resistor 255 are connected in shunt or parallel with the AC1 and AC2 lines to provide filtering for the rectifier filter.

Two diodes 256 and 257 are connected in parallel across the AC1 and AC2 lines and serve as flyback diodes to maintain constant current flow and avoid high voltage spikes generated by the inductance of choke 258. A conventional LC filter network comprised of an inductor 258, a capacitor 259, and a group of 10 100 microfarad capacitors 260 is provided for primary filtering of the AC signals AC1 and AC2.

The output voltage of the rectifier filter is taken across the 10 100 microfarad capacitors on leads + VOP, the positive lead, and − VON the negative or ground lead. Connected across the output of the power supply is an additional diode 261' which is utilized to protect the load in the event of a reverse voltage being applied on the output leads of the power supply. A thyristor or silicon controlled rectifier (SCR) 261 has its anode connected to the positive terminal and its cathode connected to the negative terminal of the output power supply. The gate electrode of SCR 261 receives the GATE signal on conductor 38 from the crowbar circuit. This SCR is fired whenever the output voltage VOP exceeds 7 volts as sensed by the crowbar circuit which monitors the VOP and VON voltages on conductors 58 and 98 respectively. The VOP voltage is also provided to the reference regulator and isolator circuit where it is compared against the internally generated reference voltage REF in the reference regulator and isolator 56 of FIG. 1. VOP is also provided to the monitor on/off and limits circuit, wherein VOP is compared with the RE voltage on conductor 62 to control the indicator and the generating of the ALARM signal on conductor 99. The VON or negative line is also fed to the monitor on/off and limits circuit.

Reference is now made to the crowbar of FIG. 14. This circuit is provided to prevent the output voltage VOP from exceeding a predetermined voltage (e.g. +7 volts). This circuit monitors the VOP and VON terminals from the output of the rectifier filter on conductors 42 and 41 respectively. The +20 volts from the internal power inverter 22 is provided to the collectors of an NPN transistor 265 via three series connected resistors 262, 263, and 264. A diode 266 has its cathode connected at the junction of resistors 263 and 264 and its anode connected to the VOP line 42. By connecting the +20 volts and the VOP voltage in this manner it insures that the collector of transistor 265 will develop enough power to drive the output on its emitter on lead 38 going to the SCR of the rectifier filter.

A bypass capacitor 267 is also provided from the +20 volt line to the VON line to prevent noise on the +20 volt line from affecting the operation of the crowbar circuit. The series combination of resistors 268, 269 and a 5.6 volt zener diode 270 are connected across the VOP and VON lines. Resistor 269 is a potentiometer for providing the proper bias voltage to the base of a transistor 271 via a base resistor 272. A noise suppression capacitor 273 is connected from the base of transistor 271 to the VOP line. A diode 274 is utilized to connect the VOP voltage to the emitter of transistor 271. Collector bias voltage is provided for transistor 271 via two resistors 275 and 276 connected in series from the collector of transistor 271 to the VON line. The junction of resistors 275 and 276 is also connected to the base of transistor 265 to provide base bias voltage for that transistor. A capacitor resistor pair 278, 279 is connected in parallel, the pair being connected to the emitter of transistor 265 and to the VON line. Capacitor 278 is a bypass capacitor, whereas resistor 279 provides bias voltage for the emitter circuit of transistor 265.

The emitter of transistor 265 is also connected to the base of transistor 280 via a resistor 281. The emitter of transistor 280 is connected to the VON line and its collector provides an output signal on conductor 43 via a resistor 282 whenever transistor 280 conducts. A series connected capacitor 283 and resistor 284 are connected in a feedback path from the collector of transistor 265 to the input or base of transistor 271.

During normal operation of the power supply the output voltage VOP is normally at +5 volts. As a result, there is insufficient current flowing into the crowbar circuit to cause that circuit to generate the GATE signal on conductor 38. Let it be assumed, however, that the output voltage VOP goes to or exceeds +7 volts. When this occurs the 7 volts on the VOP lead 42 is applied to the anode of diode 274. Also the 7 volt zener diode 270 conducts, dropping the voltage at the base of transistor 271. This results in turning on transistor 271 due to current flow through diode 274, the emitter base circuit of transistor 271, resistor 272, potentiometer 269 and diode 270. When transistor 271 turns on a positive voltage is applied to the base of NPN transistor 265 causing that transistor to turn on. Transistor 265, which is an emitter follower, applies a positive voltage to the base of transistor 280 also turning that transistor on. The positive GATE signal on lead 38 is now applied to the gate lead of the SCR of the rectifier filter causing that rectifier to short out the output terminals VOP and VON reducing the output voltage to approximately 2 volts. Simultaneously transistor 280 applies a negative $\overline{\text{GATE}}$ signal via lead 43 to the input of a comparator 286 of the high volatge cutoff isolator. The $\overline{\text{GATE}}$ signal results in the inverter being shutoff as will subsequently be described.

When transistor 265 turns on a negative voltage drop at its collector is fed back via capacitor 283 and resistor 284 to the base of transistor 271, insuring a positive turning on of that transistor. An additional capacitor 285 serves merely as a bypass capacitor connecting the VOP and VON lines together to prevent noise generation in the circuit.

Reference is now made to the high voltage cutoff and isolator circuit of FIG. 13. In the sheet of drawing incorporating FIGS. 13 and 14 conductor 43 connects the $\overline{\text{GATE}}$ signal to one input of a comparator 286 of FIG. 13. This input is on a conductor 287 which also receives the reference voltage REF on conductor 54 from the reference regulator and isolator 56 via a resistor 288 and a potentiometer 289. Potentiometer 289, connected at one end to the RSN line, serves to adjust the threshold level of the REF voltage for comparator 286. The voltage from the slider of potentiometer 289 is adjusted so that the ouput of the comparator will react properly with a predetermined amplitude of input voltage applied to its other input on a conductor 290.

The other input on conductor 290 is derived from the AC1 and AC2 signals from the secondary of transformer T1. These two signals are applied to the high voltage cutoff and isolator on conductors 50 and 52 and are rectified by two diodes 291 and 292. The rectified output of diodes 291 and 292 are filtered by a conventional RC filter network comprised of resistors 293, 294, 295, 296, and a capacitor 297.

From the previous description of the output power inverter 28 it will be recalled that inverter generates an AC pulse width modulated wave. It is this wave which is rectified and filtered and applied to the input of the comparator on conductor 290. The rectified signal on conductor 290 is compared in comparator 286 with the value of the reference voltage REF on conductor 287. When the rectified voltage on conductor 290 exceeds the value of the REF voltage, the comparator output is 0 volts or a negative value. If the rectified voltage on conductor 290 is less than the REF voltage, the output of the comparator is at some positive potential. The comparator is connected between +20 volts and RSN to receive its bias voltage.

The +20 volts is also applied to two optical isolator networks IS3 and IS4 through two corresponding resistors 298 and 299. Resistors 298 and 299 are connected to the anode of light emitting diodes (LED's) in their respective isolators IS3 and IS4. The cathodes of each of the LED's IS3 and IS4 are connected to the output of the comparator 286.

When there is not an over voltage condition (that is, when AC1 and AC2 are less than the REF voltage) the output of the comparator is positive keeping the LED's substantially in the nonconducting state. However, when AC1 and AC2 (rectified voltage on conductor 290) is greater than the REF voltage the output of the comparator goes to 0 volts. The 0 volts on the cathodes of each of the LED's causes those diodes to conduct causing light (e.g. infra red) to be emitted therefrom as shown by the arrows in IS3 and IS4. This light impinges on two photo transistors, one associated with each of the isolators. The collectors of each of the photo transistors in IS3 and IS4 is connected to the +5 volts. The emitters of these transistors are connected together and in turn connected to the input of the high voltage limit shutoff latch circuit 48 via conductor 46. When the two LED's diodes are out, the photo transistors in IS3 and IS4 substantially represent an open circuit, thus no voltage is applied on the SO line 46.

The comparator 286 of FIG. 13 is essentially a conventional voltage comparator, thus it is shown merely as a block in FIG. 13. However, in the latter portion of this specification there is a complete listing of all of the components, utilized in the power supply 10.

Reference is now made to the reference regulator and isolator circuit of FIG. 11. This circuit is comprised basically of a precision voltage reference regulator, a comparator and an isolator circuit for providing the feedback FBK signal to the feedback circuit 78 (FIG. 1). The plus 20 volts and RSN lines are connected to this circuit from the internal power inverter 22. A reference regulator and comparator 300, shown in symbolic form, receive bias voltage from the +20 volts on conductors 301 and 302. The +20 volts on conductor 301 is provided to circuitry not shown internal to the regulator and comparator 300, where as, the +20 volts on conductor 302 is applied to the collector of an NPN transistor 303. Ground potential or RSN is provided to the comparator 300 on conductors 304 and 305. Conductor 305 is connected to the anode of a 7.1 volt zener diode 306. Diode 306 forms a precision voltage regulator for generating 7.1 volts which is utilized as the voltage reference REF. The reference voltage REF is applied on conductor 54 to the high voltage cutoff and isolator circuit previously described and also to the monitor on/off and limits circuit on conductor 62. Three series connected resistors 307, 308 and 309 are bridged across the REF line 54 and the RSN line. Resistor 308 is a potentiometer used to adjust the REF voltage to a non-inverting input of a comparator amplifier 310 via a resistor 311. The other input to the comparator amplifier 310 is the VOP (+5 volts) power supply output voltage on conductor 58. This voltage is applied to an inverting input 312 of the amplifier 310 via a resistor 313. The output of the reference regulator and comparator is provided from the emitter of transistor 303 to the cathode of a 6.3 volt zener diode 314. Zener diode 314 has its anode connected to two isolators IS1 and IS2 via two resistors 315 and 316 corresponding to each of those isolators. The isolators IS1 and IS2 are similar to the previously described isolators IS3 and IS4. Each of these isolators contains a light emitting diode (LED) having their anodes correspondingly connected to resistors 315 and 316. The cathodes of each of the LED's are connected to RSN ground potential. Each isolator also contains a photo transistor having their collectors connected to the +5 volt bus of the internal power inverter 22. The FBK signal on conductor 60 is taken from the common emitters of the isolators and provided to the feedback circuit 78. The FBK signal is a variable signal which can vary between 0 volts and +5 volts. If the VOP voltage goes lower than the REF voltage the output of amplifier 310 goes positive turning on transistor 303. The emitter of transistor 303 will thus apply a positive voltage to the 6.3 volt zener 314 causing it to turn on. When zener diode 314 turns on, a positive voltage is applied to the anodes of each of the diodes in IS1 and IS2 causing those light emitting diodes to be illuminated and impinge light on their corresponding transistors. The impinging light from each of the LED's will cause the resistance of their corresponding transistors to vary inversely with the intensity of the emitted light and thereby cause the transistors to provide a feedback signal FBK having a magnitude corresponding to the difference between the REF and output voltage VOP. If the output voltage VPO of the power supply, as applied to amplifier 310, is higher than the REF voltage, the output of amplifier 310 will be at a lower value than previously described, thus causing transistor 303 to generate a smaller output voltage on its emitter. This results in cutting down the amount of current flow through zener diode 314 thus varying the intensity of the light emitted by the LED's in each of the isolators IS1 and IS2. The end result is a reduction in the amplitude of the feedback signal RBK on conductor 60.

Loop stabilization is provided around the comparator 300 by the incorporation of resistors 317, 318, 319, capacitors 320 and 321, and a 6.2 volt zener diode 322. The output of amplifier 310 is connected via conductor 323 to one end of resistor 317. One end of resistor 318 is connected to the RSN bus via a conductor 324. Resistor 318 is in series with capacitor 320 the latter being connected to the junction of resistors 317 and 319. Resistor 319 connected in series with the parallel combination of capacitor 321 and zener diode 322 is connected back to the inverting input 312 of amplifier 310. These components in this stabilization loop prevent transients at the output of amplifier 310 from effecting the input at 312 and zener diode 322 prevents the input of amplifier 310 from exceeding 6.2 volts.

It is significant to point out at this time the isolators IS1 and IS2 as well as isolators IS3 and IS4 of the high voltage cutoff and isolator circuit 44 provide complete electrical isolation up to at least 1500 volts to isolate the input and output circuits of the power supply.

Figure 12:
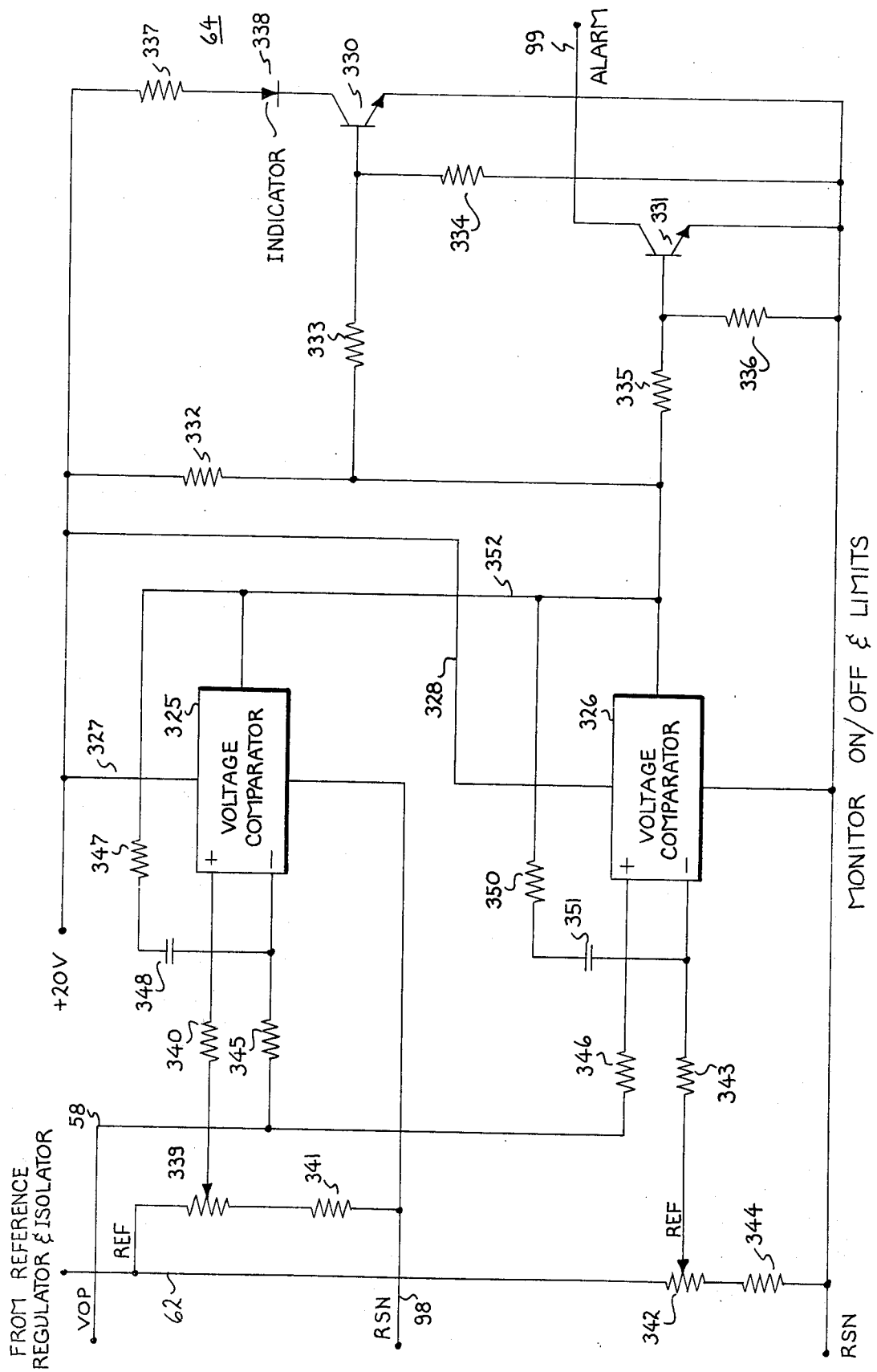
FIG. 12 is a schematic of the Monitor ON/OFF Limit Circuit 64 of FIG. 1.

As previously mentioned the REF voltage on conductor 62 is provided to the monitor on/off and limits circuit 64. Reference is now made to FIG. 12 which shows in schematic form the monitor on/off and limits circuit 64. The +20 volts and RSN line from the internal power inverter 22 are also connected as bias voltage for this circuit. The +20 volts is connected to two voltage comparators 325 and 326 on conductors 327 and 328 respectively. Additionally, the +20 volts provides bias voltage for two transistors 330 and 331. Bias voltage for the base of transistor 330 is provided via two series connected resistors 332 and 333. An additional bias resistor 334 is connected between the base of transistor 330 and the RSN line. Base bias voltage for transistor 331 is provided from the +20 volt line via resistor 332 and a series connected resistor 335. Also, a resistor 336, like resistor 334, is connected from the base of transistors 331 to the RSN line. The emitter of each of the transistor 330 and 331 is also connected to the RSN line. A resistor 337 is connected in series with an indicator 338 represented as a light emitting diode (LED). These latter two components are connected between the collector of transistor 330 and the +20 volt line to provide collector voltage for that transistor. The purpose of the indicator 338 will subsequently be described. The ALARM output signal is provided from the collector of transistor 331 on conductor 99.

Voltage comparators 325 and 326 serve to monitor the output voltage VOP on conductors 58 to see if that voltage is within specified limits. Comparators 325 and 326 are utilized to monitor high and low margins of the VOP output on conductor 58. The REF input to voltage comparator 325 is adjusted so that the comparator can detect if the output voltage VOP is above or below 5.25 volts. The REF input to voltage comparator 326 is adjusted to determine if the output voltage VOP is above or below 4.75 volts.

The REF voltage from the precision regulator of the reference regulator and isolator circuit 56 is provided on conductor 62 to each of the voltage comparators. The REF voltage is applied to a positive (+) input terminal of comparator 325 via a potentiometer 339 and a resistor 340. A resistor 341 is connected in series with resistor 339 and to the RSN bus on conductor 98. In a similar fashion, the REF voltage is applied to a negative (−) input terminal of comparator 326 via two resistors 342 and 343. Like resistor 341, a resistor 344 is connected in series with resistor 342 and to the RSN bus.

Output voltage VP on conductor 58 is provided to each of the comparators 325 and 326 via two corresponding resistors 345 and 346. Loop stabilization for each of the comparators 325 and 326 is provided by a corresponding series connected resistor and capacitor 347, 348 and 350, 351 respectively connected from the output to the input of each of the comparators.

To describe the operation of the voltage comparator assume that the VOP output voltage is below 5.2 volts. With this condition the output of the high voltage comparator 325 on conductor 352 will be at approximately 20 volts. This 20 volt signal on conductor 352 will cause transistors 331 and 330 to both be turned on. In a similar fashion, the output of the low voltage comparator 326 will be at 20 volts also turning on transistors 330 and 331. When these two transistors are turned on the collector of transistor 331 will provide a zero volt ALARM signal on line 99 indicating the absence of an alarm condition. Transistor 330 being on will draw current through its emitter collector circuit causing the indicator 338 to turn on lighting the LED which gives two indications; (1) power is applied to the power supply, and (2) VOP is within limits.

If the output voltage VOP is higher than 5.25 volts or lower than 4.75 volts the output of the corresponding comparator 325 and 326 respectively will be at 0 volts, thus clamping the base of transistors 330 and 331 to 0 volts. This turns off transistors 330 and 331 causing the ALARM signal to appear on conductor 99 and turning off transistor 330 to extinguish the LED indicator 338. It will be noted that the only indication provided for power on and for power in limits condition is the indicator 338. In all known prior art on power supplies an indicator is utilized to indicate only that power is applied to the power supply. In some power supplies two indicators are used, one to indicate that power is applied to the supply and another to indicate that the supply is operating within specified limits. However, in the present embodiment the indicator 338 serves two functions, that of giving a visible indication that the power supply is operating within its specified limits and further that power is applied to the power supply. As previously mentioned, the alarm line 99, in order to activate an external alarm, must be connected to an external voltage source not shown.

The basic timing for the operation of the power supply circuits is shown and illustrated by reference to the isolator and blank circuit 66 of FIG. 3. That circuit is comprised primarily of a unijunction transistor oscillator circuit for deriving the basic BLANK and $\overline{BLANK}$ signals and a flip-flop for deriving the logic signals LOGA and LOGB. The unijuncton oscillator circuit is comprised primarily of a resistor 354 connected at one end to the +5 volts. Two additional resistors 355, 356, and a capacitor 357 are connected in series with resistor 354 with the one end of the capacitor 357 being connected to the −5 volt line. A bypass capacitor 358 is also included in the oscillator circuit and is connected from the junction of resistors 354 and 355 to the −5 volt line. The +5 volts is applied via a conductor 359 to one of the base electrodes of a unijunction transistor 360. The other base electrode of transistor 360 is connected to the −5 volts via a resistor 361.

In the operation of the oscillator, the unijumeter transistor 360, resistors 354, 355, potentiometer 356 and capacitor 357 determine the timing of pulses generated across resistor 361. This pulse timing is adjusted by the adjustment of potentiometer 356. The output of unijunction transistor 360 is applied to the base electrode of an NPN transistor 362. Transistor 362 serves to amplify and isolate the oscillator pulses from transistor 360. In setting up the output pulses from transistor 362, potentiometer 356 is adjusted to achieve approximately 25 microseconds between pulses (See FIG. 18 or 19). The emitter of transistor 362 is connected to the −5 volt line and the output or collector of transistor 362 provides the BLANK signal on conductor 74 and also provides that signal to a logic flip-flop FLOG.

The FLOG flip-flop receives its bias voltages from the −5 volt bus and the HCOM or common bus. The primary purpose of this flip-flop is to respond to the BLANK signal as shown in FIGS. 18 and 19 to generate two opposite sense output signals LOGA and LOGB which are fed to the base driver circuit 72. As previously mentioned these two signals, LOGA and LOGB, are utilized in the base driver circuit as the basic steering signals for driving the output power inverter 28. The BLANK signal is also fed to the base of an NPN transistor 363 via a resistor 364. Bias voltages for the base circuit of transistor 363 are provided by a resistor 365 connected between the HCOM line and the collector of transistor 362. Another base bias resistor 366 is connected between the base of transistor 363 and the −5 volt line. Collector voltage for transistor 363 is provided via a resistor 367 connected between the collector of transistor 363 and HCOM. A bypass capacitor 368 is also provided from the HCOM line to chassis ground. The $\overline{BLANK}$ signal on conductor 79 is taken off the collector of transistor 363 and fed to the feedback circuit 78 (FIG. 1). This latter signal is also shown in the timing diagrams of FIGS. 18 and 19.

Figure 8:
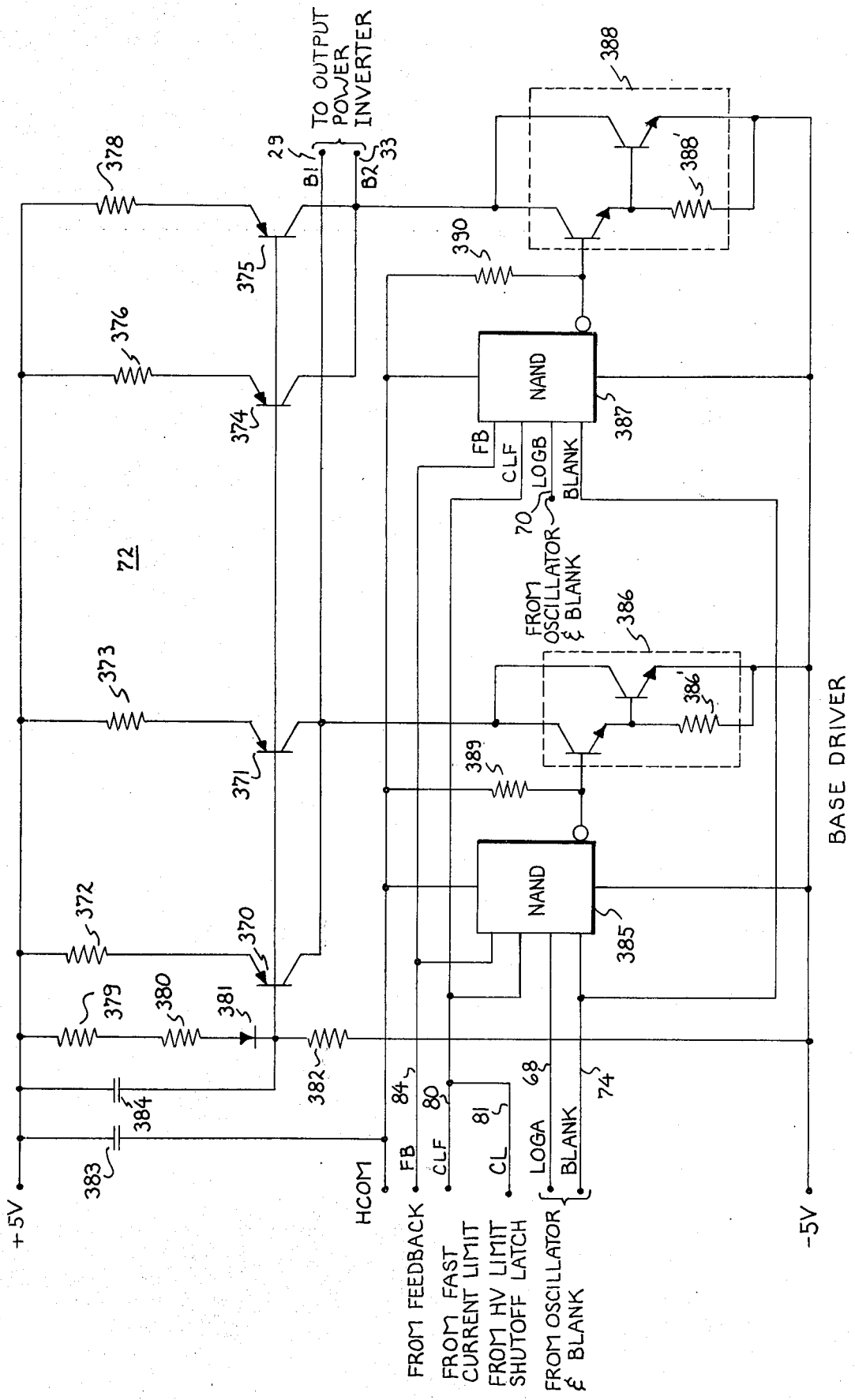
FIG. 8 is a schematic of the Base Driver Circuit 72 of FIG. 1.

Reference is now made to the base driver circuit of FIG. 8. The primary purpose of this circuit is to provide the two base driver signals B1 and B2 on conductors 29 and 33 respectively to the bases of the power transistors in the output power inverter of FIG. 16. It is these two signals which control the operation of the output power inverter. The base driver circuit is comprised basically of two current sources and two base turn off circuits for the power transistors in the output power inverter. One of these current sources is associated with the B1 output signal and is comprised of two parallel transistors 370 and 371. Transistors 370 and 371 each receive their emitter voltages from the +5 volt line through two resistors 372 and 373 respectively. The other current source for output line B2 is provided by two similarly parallel connected transistors 374 and 375. These latter transistors receive their emitter voltages from the +5 volt bus via two resistors 376 and 378. Common base voltage for each of the current sources is provided by a resistor 379 connected at one end to the +5 volts and in series with a resistor 380 and a diode 381. The cathode of diode 381 is connected to the base of each of the transistors 370, 371, 374, and 375 and also to a resistor 382 having its opposite end connected to the −5 volt bus. A bypass capacitor 383 is connected between the +5 volts and HCOM busses and a noise suppression capacitor 384 is connected between the +5 volts and the base of each of the current transistors.

There is a base drive circuit associated with each of the output lines B1 and B2. The base drive circuit for the B1 line is comprised of a NAND gate 385 and a dual transistor package 386 connected in Darlington power driver configuration. In a similar fashion, the B2 output line has a base drive circuit comprised of a NAND gate 387 and a pair of power Darlington transistors 388. Each of the power Darlingtons 386 and 388 receive their base bias voltages from the HCOM line via a corresponding one of two resistors 389 and 390 respectively. As can be seen, each of the power Darlingtons 386 and 388 encompasses its own emitter base bias resistors 386' and 388' respectively. These latter resistors are connected from the −5 volt bus to the emitter and base of the two Darlington transistors. The collectors of the respective Darlington transistors 386 and 388 have their outputs connected to their respective B1 and B2 lines on conductors 29 and 33. Bias voltage for the two NAND gates 385 and 387 is provided from the HCOM and −5 volt lines.

The two NAND gates 385 and 387 each receive the same input signals with the exception of the LOGA and LOGB signals. NAND gate 385 receives the LOGA input on conductor 68, whereas NAND gate 387 receives the LOGB input on conductor 70. These two NAND gates, via the Darlington transistors 386 and 388, control the ON/OFF operation of the output power inverter 28.

Since both of the base drive turn off circuits operate in the same manner, only that circuit that operates the B1 output line 29 will be described. Five input signals are provided to NAND gate 385. Two of these signals CLF and CL are connected to a common conductor and come from the fast current limit and high voltage limit shutoff latch circuits respectively. The FB of feedback signal on conductor 84 is also provided to NAND gate 385 from the feedback circuit 78. The LOGA and BLANK signals on conductors 68 and 74 respectively are provided to the NAND gate 385 from the oscillator and BLANK circuit 66.

During normal operation of the power supply, that is when there is no over voltage or current conditions, the CLF and CL signals are both positive or binary ones. By referring to either FIG. 18 or 19 it can be seen that the FB, LOGA and BLANK signals are alternating signals which continuously change during power supply operation to control the operation of NAND gate 385. When all of the inputs to NAND gate 385 are binary ones the output of that gate is a binary 0. When the output of NAND gate 385 is at a binary 0, for all practical purposes, the Darlington transistors 386 are turned off. However, there is sufficient current flow through the emitter collector circuit of the current transistors 370 and 371 and the collector base circuit of the Darlington transistors to cause the B1 line 29 to go sufficiently positive to turn on transistor 200–204 of the output power inverter (FIG. 16). It will be recalled, as previously described, that whenever the B1 signal goes positive transistors 200, 202, and 204 of the output power inverter are turned on. It will be further recalled that simultaneously the B2 input signal to the output power inverter will be a binary 0 preventing transistors 212, 214 and 216 from being turned on. When the two signals B1 and B2 alternate as coming out of the base driver of FIG. 8 the output power inverter thus alternates to generate the pulse width modulated output signals AC1 and AC2 from the secondary of the transformer T1 of FIG. 16.

Let is now be assumed that one of the inputs to NAND gate 385 goes negative disabling that gate and causing its output applied to the base of the Darlington transistors to go positive. With the base of the Darlington transistors positive, transistors 386 will conduct clamping the collectors of the current source transistors 370 and 371 to −5 volts. This causes the B1 signal on line 29 to go to −5 volts disabling or turning off transistors 200, 202, and 204. By observation of the timing diagram of FIG. 18 in conjunction with FIG. 8 it can be seen that the LOGA and LOGB signals are always 180° out of phase with one another. Because of this, the B1 and B2 signals, under normal operating conditions, will always alternate back and forth, thus causing the inverter of FIG. 16 to alternate at a frequency controlled by the LOGA and LOGB signals.

A more thorough understanding of the operation of the base driver circuit and the timing in association therewith will become more clear as the description proceeds.

Figure 6:
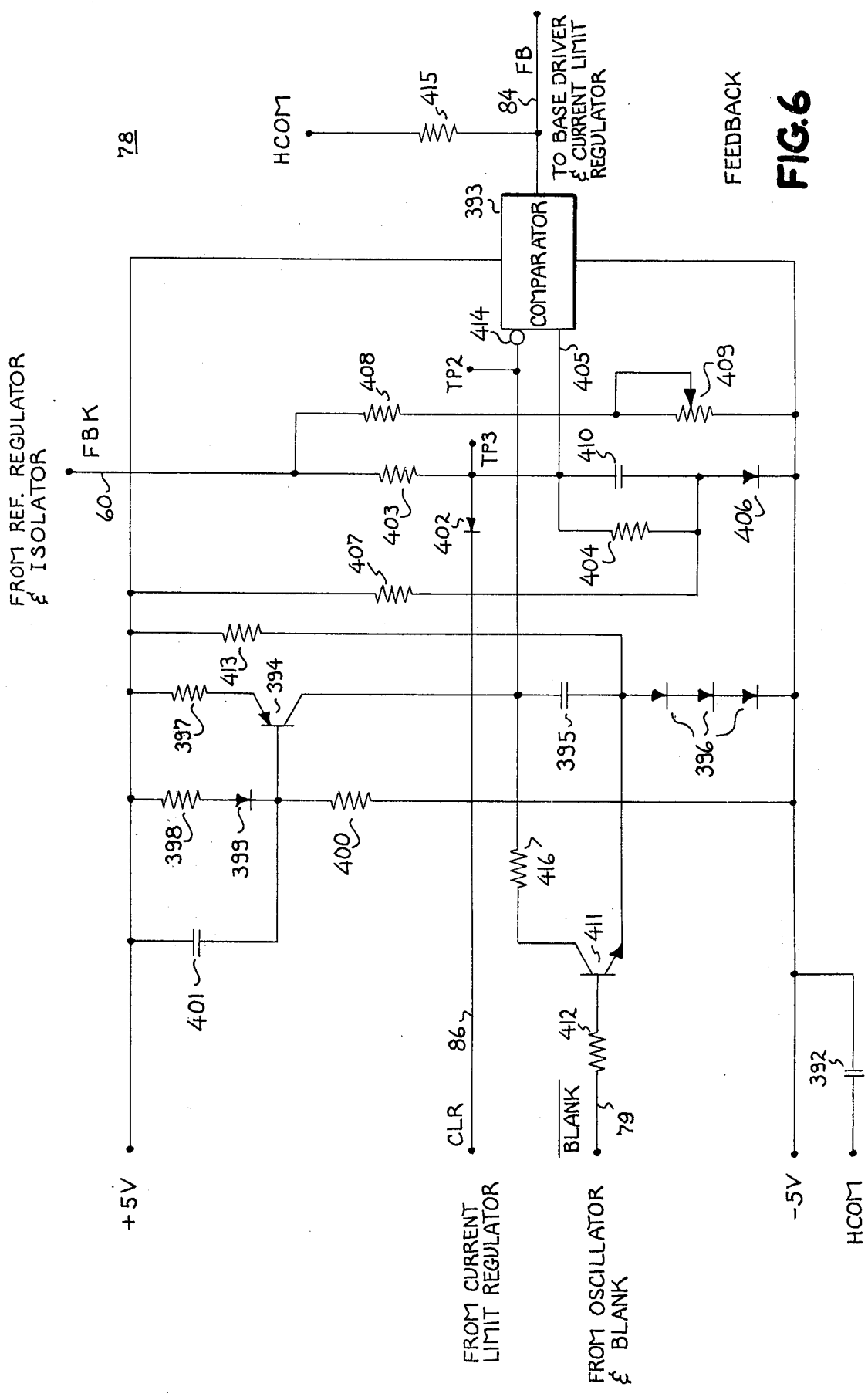
FIG. 6 is a schematic of the Feedback Circuit 78 of FIG. 1.

Reference is now made to the schmatic of the feedback circuit of FIG. 6. The feedback circuit 78 is basically a voltage regulator which converts a voltage level from two different sources (the FBK signal on conductor 60 from the reference regulator and isolator 56, and the CLR signal on conductor 86 from the current limit regulator) to a timed pulse (FB) on conductor 84 to partially control the operation of the base driver circuit 72. The generation of the FB signal can be seen under varying power supply operating conditions by referring to FIGS. 18 and 19. The + and −5 volts from the internal power inverter 22 are provided to the feedback circuit to supply the necessary bias voltages. A bypass capacitor 392 is connected from the −5 volt line to the HCOM line to prevent noise gneration in the circuit. A transistor 394 serves as a current source to allow a capacitor 395 to linearly charge from −5 volts to +5 volts through a plurality of series connected diodes 396, transistor 394 and an emitter resistor 397 of transistor 394. Base bias voltage for the current transistor 394 is provided from the −5 volt line through a resistor 398 in series with a diode 399. The remainder of the base bias circuit for transistor 394 is completed by a resistor 400 connected to the base of transistor 394 and to the −5 volt bus. A noise suppression capacitor 401 is also connected from the +5 volts to the base of transistor 394.

The CLR signal on conductor 86 is provided to a test point or junction TP3 via a coupling diode 402. The FBK feedback signal on conductor 60 from the reference regulator and isolator 56 is provided to the input of the comparator 393 via a resistor 403. Another resistor 404 is connected in series with resistor 403 to form a voltage divider, the junction of which is connected to a non-inverting input of the comparator 393 via a conductor 405. The other end of resistor 404 is connected to −5 volts through a diode 406 to the +5 volt bus via a resistor 407.

It will be recalled that the RBK signal comes from optical isolators having photo transistors with their collectors connected to +5 volts. The current from these isolator transistors is frequently quite small thus two resistors 408 amd 409 connected in series between the −5 volt and FBK lines. The purpose of these two resistors is to allow the feedback voltage FBK to be adjusted to provide sufficient current for driving the input of the comparator 393. This adjustment is provided by potentiometer 409. A noise suppression capacitor 410 is also included in parallel with resistor 404 to suppress any noise which may affect the operation of the comparator amplifier 393.

A switch for discharging capacitor 395 is comprised primarily of a transistor 411. Transistor 411 receives the BLANK signal on conductor 79 via a resistor 412. The emitter of transistor 411 is connected to the junction of capacitor 395 and the anode of the top diode of series connected diodes 396. The junction of capacitor 395 and the top diode 396 is connected to the +5 volt bus through a resistor 413 to provide the necessary emitter voltage for transistor 411. A collector resistor 416 of transistor 411 couples its output to input 414 of comparator 393.

By connecting an oscilloscope to TP3 it is possible to observe the wave shape of the FBK signal or the CLR signal on conductor 86 under the varying operating conditions of the power supply to subsequently be described. In a similar manner the charge which exists across capacitor 395 may be observed by connecting an oscilloscope at TP2 to an inverting input 414 of the comparator amplifier 393. The output of the comparator 393 provides the FB signal on conductor 84 to the base driver and the current limit regulator circuit. A resistor 415 is connected from the FB line 84 to HCOM and serves as a pull down resistor for the output of the comparator 393.

A basic understanding of the operation of the feedback circuit or voltage regulator of FIG. 6 can best be understood by reference to FIG. 18. With reference specifically to the left hand portion of FIG. 18 there is shown the generation of the FB signal as a result of a comparison of the FBK signal on conductor 60 with a ramp voltage or sawtooth signal as generated by the charge on capacitor 395. The comparator output FB is always high or a binary 1 when the volage at TP2 (input 414 of the comparator) is less than the feedback voltage FBK (+4 volts in FIG. 18). It will be noted in the far left side of FIG. 18 that the voltage at TP2 rapidly decreases from +4 to −3 volts in response to the $\overline{BLANK}$ signal. Whenever the $\overline{BLANK}$ signal goes positive as shown in FIG. 18, transistor 411 conducts to immediately discharge capacitor 395. This quick discharge is represented in FIG. 18 by the rapid change of the TP2 voltage form +4 to −3.

As soon as transistor 411 is turned off (absence of the $\overline{BLANK}$ signal) capacitor 395 begins to charge linearly as shown in FIG. 18. In this example, the capacitor will continue to charge as observed at TP2 until the BLANK signal again discharges capacitor 395. At that time the capacitor is again rapidly discharged and the process is repeated. It will be noted that capacitor 395 charges for approximately 22 microseconds and then is held in a discharged state for approximately 3 microseconds, the width of the BLANK or $\overline{BLANK}$ signals.

Referring now to the right hand portion of the timing diagram of FIG. 18 there is shown another example whereby the feedback voltage FBK at TP3 is shown to take a decrease in magnitude. It can be seen in this example that TP3 passes directly midway through the TP2 signal. So long as TP2 is less than TP3 the output signal FB will remain positive, however, as soon as TP2 becomes greater than TP3 the output of the comparator (FB) will go negative. This is indicated in the two portions of the FB wave form showing TP2 less than TP3 and TP3 less than TP2.

The other controlling input to the comparator 393 is the CLR signal on conductor 86. FIG. 19 shows in exemplary form the operation of the comparator while generating the FB signal under control of the CLR signal. In the left hand portion of the timing diagram in FIG. 19 the FBK signal is midway of the TP2 signal, thus causing the output of the comparator FB to alternate positive and negative as previously described. Further it will be noted in that left hand portion that the CLR signal is at +4 volts. Thus, diode 402 (FIG. 6) is reverse biased and the CLR signal has no affect at the TP3 or on the cmparator 393. However, referring to the right hand portion of the timing diagram of FIG. 19 it can be seen in that example that the CLR signal has changed from a +4 volts in a negative direction approaching −3 volts. This condition occurs when the primary current of the output power inverter transformer T1 exceeds the reference current IREF as applied to the current limit regulator circuit 76 as previously described. When the CLR signal goes negative as shown, that signal causes diode 402 to be forward biased, thus overriding the FBK signal and causing the output of the comparator FB to take on the shape as shown. In this example, the output signal FB is positive for a shorter period of time than in the left hand portion. By referring to the B1 and B2 signals it can be seen that these signals are on for a relatively short time, whereby the inverter is off a relatively long time indicating an overcurrent condition. It is this feature of the power supply in the present invention which allows the output voltage VOP to continue to drop under an increasing load condition while the output CLR of the current limit regulator to the feedback circuit maintains the power supply output current substantially constant. This is shown at the bottom of FIG. 19 in the right hand portion thereof whereby it can be seen that the T1 transformer primary current goes slightly positive instantaneously and then drops to a level the same as IREF the reference current. The two currents IREF and IACT are shown as the inputs to the current regulator 76 as previously described.

Figure 4:
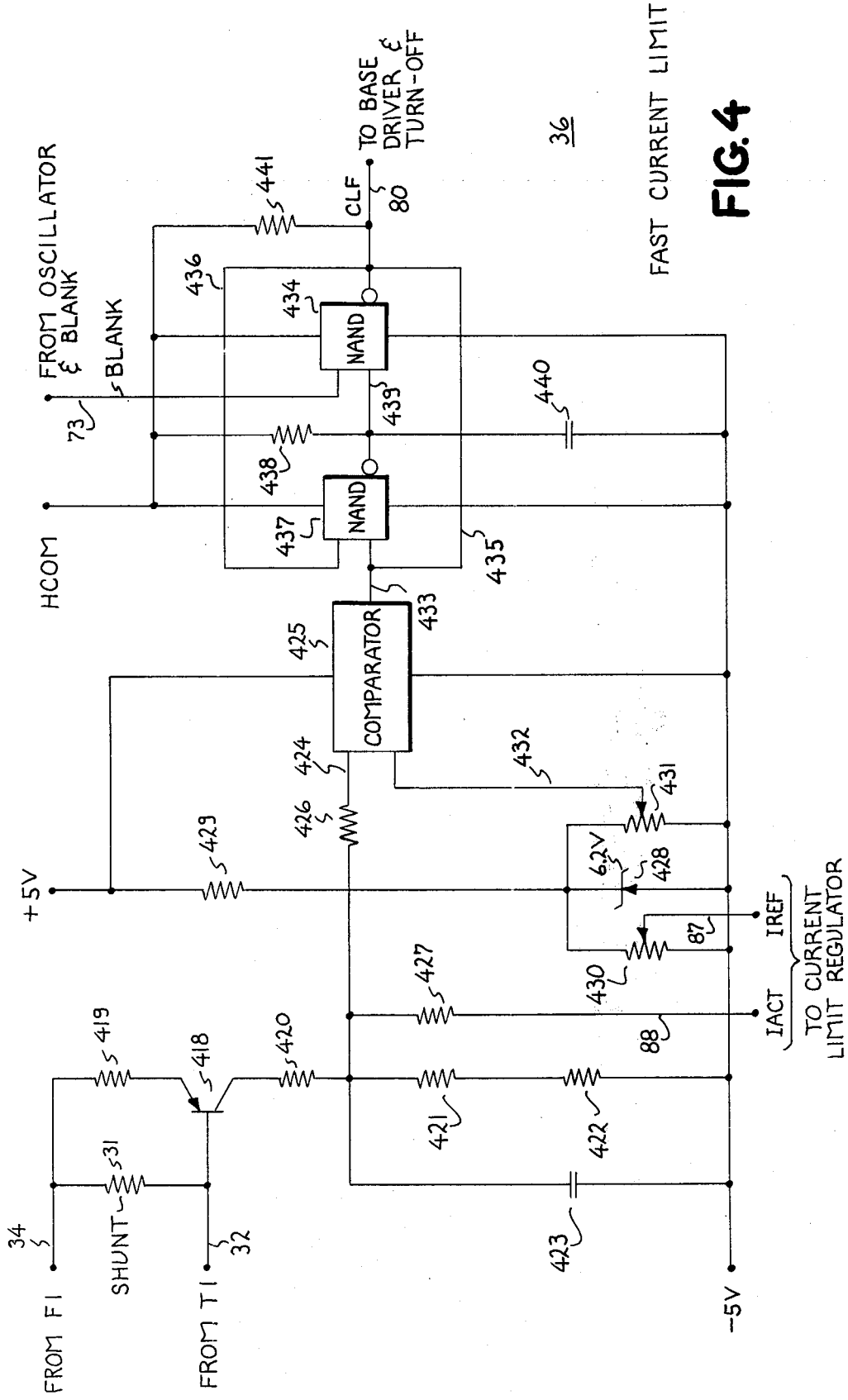
FIG. 4 is a schematic of the Fast Current Limit Circuit 36 of FIG. 1.

Reference is now made to the fast current limit circuit 36 of FIG. 4. As previously described the primary purpose of this circuit is to prevent the loss of the inverter power transistors in the output power inverter 28 due to excessive current in the output circuit of the power supply. The fast current limit circuit monitors current flowing to the power inverter primary winding of transformer T1 to turn off the base driver circuit 72 very quickly if a predetermined current level is reached.

A transistor 418 and its associated emitter resistor 419 are connected across the resistor shunt 31 duplicated in FIG. 4 for simplicity. As previously described in connection with FIG. 1, shunt 31 is in series with the inverter transformer power input line INP connecting that line via conductors 34 and 32 to the center tap of the T1 primary. Thus, current flowing in the primary of transformer T1 flows through the shunt 31. When the current flows in the primary, transistor 418 will turn on allowing current to flow through its collector circuit including 3 series connected resistors 420, 421, and 422. Resistor 422 is connected to the −5 volt bus to provide power for the collector of transistor 418. It is readily seen that the voltage developed across resistors 421 and 422 is proportional to the current flowing in the inverter transformer primary. A transient suppressor bypass capacitor 423 is connected to −5 volts and is in parallel with resistors 421 and 422.

The voltage proportional to the primary current is applied to two places. The first of these is to one input 424 of a comparator 425 via a resistor 426. The second is to the current limit regulator 76 via a resistor 427 and conductor 88. This signal is IACT, the magnitude of which is an analog of the current flowing in the T1 primary.

A 6.2 volt zener diode 428 is connected from the −5 volt bus to the +5 volt bus via a resistor 429. Diode 428 serves as a reference voltage generator for two potentiometers 430 and 431 connected in parallel with the zener diode and to the −5 volt bus. Potentiometer 431 is set to a specified level to provide a voltage to a second input of the comparator 425 via a conductor 432. When the reference voltage or level on conductor 432 is higher than the analog of the current at input 424, the comparator 425 generates a binary 1 or a high signal on its output conductor 433. If the analog of the current at input 424 is higher than the reference level on conductor 432, the output of the comparator goes to a binary 0. This has the effect of stopping or turning off the inverter 28. The pulse width or signal duration of the comparator binary 0 output is substantially equal to the time that the primary circuit current is greater than the predetermined value of the reference level on conductor 432. During operation of the power supply, when the transformer primary current, (that is the analog of the current) drops below the reference level on conductor 432, the comparator output returns to a binary 1 condition and the inverter can again operate.

Two NAND gates 434 annd 437 are connected to the output of comparator 425 and serve basically as a latch circuit for the fast current limit. When the output of the comparator 425 is a binary 1, that signal is applied to one input of gate 437 and to the output of gate 434 via conductors 433 and 435 respectively. The binary 1 signal is fed back to a second input of NAND gate 437 via conductor 436. With two binary 1 inputs applied to gate 437 its output on conductor 439 becomes a binary 0. A pull up resistor 438 is connected between the output of NAND gate 437 and the HCOM bus. With a binary 0 signal applied to one input of NAND gate 434 its output is latched in a binary 1 or set state causing the CLF signal on conductor 80 to remain at a binary 1 state. The BLANK signal on conductor 73 from the oscillator and blank circuit is normally a binary 1 (see FIG. 18) and is applied as a second input to NAND gate 434. The BLANK signal however, has no affect on gate 434 so long as its input on conductor 439 is a binary 0.

Let it now be assumed that current in excess of the reference level begins to flow through the primary of transformer T1. With his increase in current the output of comparator 425 goes to a binary 0. This binary 0 signal on conductors 433, 435 and 436 clamps the output of gate 434 at a binary 0 or reset state and disables NAND gate 437 causing its output to go to a binary 1. Clamping the output of gate 434 to a binary 0 causes the output CLF of NAND gate 434 to go to a binary 0 turning off inverter 28. NAND gate 434 will remain enabled so long as the BLANK signal is at a binary 1, thus keeping its output at a binary 0 and clamping the output of the comparator at a binary 0. When the BLANK signal (binary 0) on conductor 73 appears at the second input of gate 434 its output will go to a binary 1 turning the inverter back on, provided that the output of comparator 425 is not clamping the output of gate 434 at a binary 0.

When the excessive current ceases to flow in T1 the comparator 425 will generate a binary 1 output signal on conductors 433, 435 and 436, provided that gate 434 is not enabled. When the LATCH signal goes to a binary 0, gate 434 is disaled to generate a binary 1 CLF signal to again set the latch. Inverter operation can now resume. A bypass capacitor 440 is also included at the output of NAND gate 437 and connected from that output to the −5 volt bus. Additionally, a pull up resistor 441 is connected from conductor 80 to the HCOM bus. The +5 volts provides bias voltage for the comparator 425. Additionally the −5 volt bus is applied to each of the NAND gates 434 and 437 in conjunction with the HCOM bus to provide proper biasing for those circuits.

Figure 5:
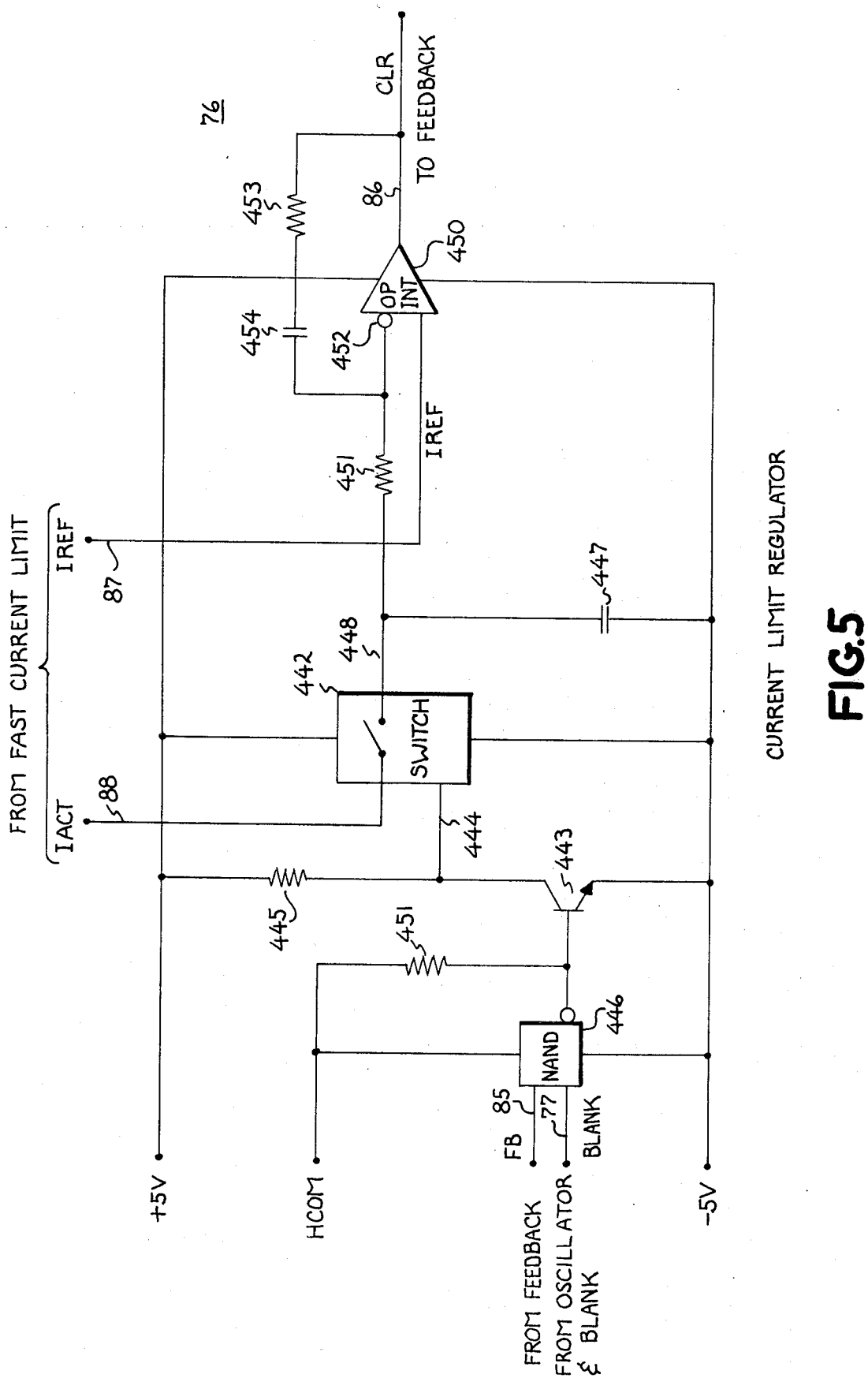
FIG. 5 is a schematic of the Current Limit Regulator 76 of FIG. 1.

Still referring to the fast current limit circuit of FIG. 4 it will be noted that the output voltage IREF on conductor 87 is provided to the current limit regulator circuit 76 along with the IACT voltage. The use of these two voltages is explained in connection with the now referenced FIG. 5 showing in schematic form the current limit regulator 76.

The current limit regulator is an important adjunct to the operation of the power supply of the present embodiment. This circuit functions to cause the power supply to become a current regulator to hold current nearly constant while allowing the output voltage to decrease with an increasing load whenever the power supply output achieves maximum current limit. In the current limit regulator of FIG. 5 the IACT voltage (the analog of the current in transformer T1) is utilized for current regulation. The IACT voltage is applied as one input to a semi-conductor switch 442. Switch 442 is shown in simplified form merely as a manually operable switch, however, this switch is of semi-conductor variety, (e.g., CMOS switch). The other input to switch 442 is from the collector of a transistor 443 on a conductor 444. A collector resistor 445 for transistor 443 is conected to the +5 volt bus. The emitter of transistor 443 is connected to the −5 volt bus, as is a NAND gate, 446 and a switch 442. A storage capacitor 447 is also connected from an output conductor 448 of switch 442 to a −5 volts. Additionally an operational amplifier 450 serving as an integrator receives −5 volts.

The +5 volts is also connected to switch 442 and to the operational amplifier 450. The HCOM bus is provided to NAND gate 446 and also to a resistor 451 serving as a pull up resistor for the output of NAND gate 446. NAND gate 446 receives two input signals, the FB signal from the feedback circuit, and the BLANK signal from the oscillator and blank circuit. When these two input signals are both binary 1's the output of gate 446 is a binary 0, thus turning off NPN transistor 443 and allowing switch 442 to close. When NAND gate 446 is disabled (that is either or both of the FB and BLANK signals are at a binary 0) the output of gate 446 is a binary 1 causing transistor 443 to conduct. When transistor 443 conducts its collector goes to a binary 0 at conductor 444 disabling or opening switch 442.

Whenever switch 442 is closed, capacitor 447 will charge to a voltage level representative of the analog of the current corresponding to the level of the IACT signal. Whenever switch 442 opens capacitor 447 will maintain its charge to thus present a constant DC level on conductor 448. This level is equivalent to the analog of the current flowing in the T1 transformer primary. The voltage on conductor 448 from capacitor 447 is applied through a resistor 451 to an inverting input 452 of the operational integrator amplifier 450. The other input voltage to amplifier 450 is the IREF voltage on conductor 87. This voltage is applied to a non-inverting input of amplifier 450. Amplifier 450 operates as follows. When the analog of the current on conductor 448 is below the IREF level, the output of the integrator (CLR) is at its maximum position value as previously described. By referring to the feedback circuit of FIG. 6 it can be seen that when the CLR signal is positive diode 402 is reversed biased, thus having no affect on the operation of the feedback circuit. However, when the IACT current or level at input 452 of amplifier 450 is higher than the reference voltage IREF, the CLR signal will integrate toward a negative level. When the CLR signal integrates toward a negative level it will cause diode 402 of the feedback circuit (FIG. 6) to be forward biased thus altering the pulse width of the FB signal on conductor 84 in a manner as previously described.

The overall operation of the current limit regulator can best be understood by reference to FIG. 19. In that figure the T1 primary current is shown as a rectangular wave which follows the B1 and B2 signals. Whenever B1 or B2 is at a binary 1 the inverter is on and current is flowing in the inverter transformer T1. Further it will be noted that the FB signal is always at a binary 1 whenever the inverter is turned on and current is flowing. The BLANK signal is also at a binary 1 at least during a portion of the time that the FB signal is at a binary 1. Referring back to FIG. 5 it can now be seen that when the FB and BLANK signals are both binary 1, the switch 442 is turned on and it is at this time that current is flowing through the inverter as shown in the timing diagram. It is significant to note it is at the time when T1 current is flowing that capacitor 447 is charged. Thus, the T1 primary transformer current is looked at only when current is flowing in the transformer. The end result of charging capacitor 447 in this manner is that a signal for current regulation is developed which can be used to regulate the output current of the power inverter 28.

In the exemplary left hand portion of FIG. 19 it will be noted that the IACT level remains relatively constant with the T1 current. However, should an excessive load condition occur, or some malfunction causing a rapid increase in the T1 primary current, the current will jump radically in a positive direction as shown in the right hand portion of the timing diagram of FIG. 19. It will be noted at this that a positive change in the IACT signal causes the CLR signal from the output of amplifier 450 to integrate rapidly in a negative direction. In the example of FIG. 19 the CLR signal is shown integrating from a +4 volts toward a −3 volts. When the CLR signal becomes sufficiently negative the diode 402 of the feedback circuit of FIG. 6 is forward biased, thus altering the output of the comparator 393 to cause a decrease in the output voltate by altering the pulse width of the FB signal while simultaneously holding the transformer primary current equal to the reference current or voltage IREF. The T1 current waveshapes shown in FIG. 19 is an alternating current signal which can be observed with an oscilloscope at the junction of resistors 420 and 421 of the fast current limit circuit of FIG. 4. The IACT signal, which is an analog of this alternating T1 current, can be observed as a DC level at the input 452 of the current limit regulator of FIG. 5. Reference is now made back to FIG. 5 which further includes resistor 453 connected in series with a capacitor 454 for providing the conventional feedback around operational amplifier 450.

Figure 7:
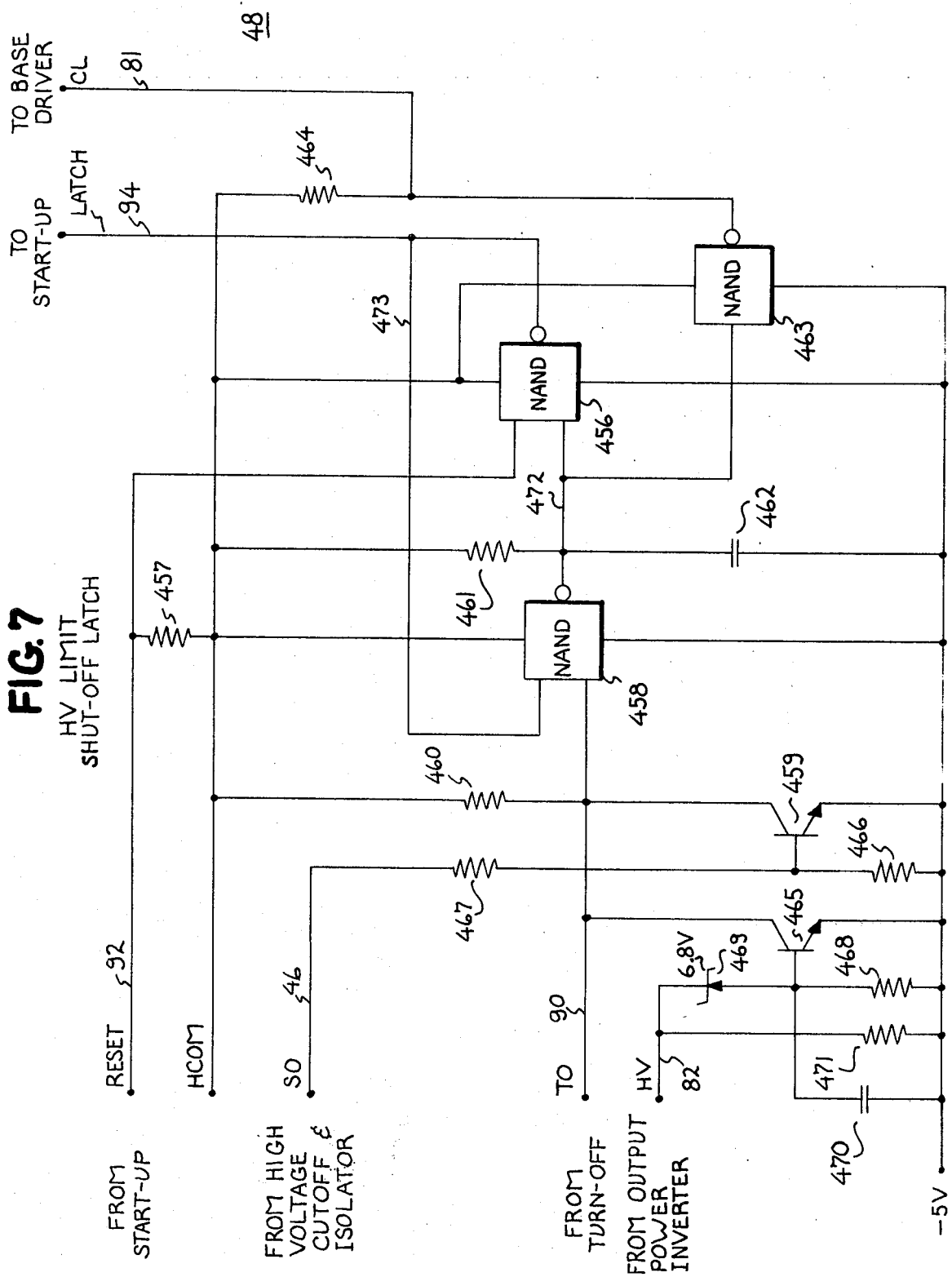
FIG. 7 is a schematic of the High Voltage (HV) Limit Shut Off Latch Circuit 48 of FIG. 1.

Reference is now made to FIG. 7 to the high voltage limit shutoff latch circit 48. The primary purpose of this circut is to turn off the output power inverter, via the base driver circuit 72, whenever the output voltage VOP exceeds a predetermined level. The High voltage limit shutoff latch circuit monitors the SO signal on conductor 46. When the level of the SO signal goes to a binary 1 the CL signal is generated on conductor 81 to turn off the output power inverter through the base driver circuit 72. This high voltage shutoff feature is significant when two supplies like 10 and 12 are operated in parallel. When two supplies are operating in parallel the power supply which is operating in an overvoltage condition can shutoff itself (turn off) before its crowbar voltage is reached. This feature allows uninterrupted power operation in the event of a power supply generated overvoltage by allowing the overvoltage power supply to automatically shut down while the other power supply picks up the load and continues to provide regulated voltage to the load.

Power supply reset, utilizing the high voltage shutoff latch circuit in conjunction with the startup circuit 93 and the turnoff circuit 91, is automatic as will subsequently be described. If the power supply is turned off due to operation of the high voltage limit shut-off latch 48, the power supply will be turned back on in approximately 1 second. If a failure which causes an overvoltage condition to occur is still present when the supply is turned back on it will cycle through its turnoff state and then turn back on in approximately 1 second. This recycling will continue until either power is turned off or until the malfunction causing the overvoltage condition is removed.

As can be seen by referring to FIGS. 1 and 7, the shut-off latch circuit 48 also interfaces with the startup circuit 93. The RESET signal on conductor 92 is provided to the shut-off latch circuit 48. The RESET signal effects the generation of the LATCH signal on conductor 94 to the startup circuit. An additional turn off signal TO is also provided to the shut-off latch 48 on conductor 90 from the turn off circuit 91.

Under normal operating conditions the RESET signal on conductor 92 is at a high voltage or binary 1 state at one input of a NAND gate 456. A pull up resistor 457 is connected between the HCOM bus and the reset line 92 and serves as a collector resistor for the output of a drive transistor generating the RESET signal in the start up circuit 93. The HCOM bus is also connected as a bias line to NAND gate 456 and an additional NAND gate 458. Further the HCOM bus is connected to the collector of a transistor 459 via a resistor 460. The HCOM bus also is connected to a pull up resistor 461 for the output of NAND gate 458. A bypass capacitor 462 is also connected from the output of NAND gate 458 to the −5 volt bus. A NAND gate 463 also has its output terminal connected through a pull up resistor 464 to the HCOM bus. The −5 volt bus provides bias voltage for NAND gates 456, 458 and 463 as well as emitter bias voltages for transistors 459 and 465. Base bias voltage for transistor 459 is provided by a resistor 466 connected from the −5 volts to the base of that transistor. An additional resistor 467 is connected from the base of 459 to the SO input line 46.

A base bias resistor 468 is connected between the −5 volts bus and the base of transistor 465. The base of transistor 465 is also connected to the high voltage (HV) line 82 through a 6.8 volt zener diode 469. Capacitor 470, connected between the base of transistor 465 and the −5 volt bus, serves as a noise suppressor. An additional resistor 471 is connected between the −5 volt bus and the HV signal line 82. By referring to the output power inverter (FIG. 16) it can be seen that resistor 471 is in series with resistor 244. These two resistors form a voltage divider whereby the voltage developed across resistor 471 controls the operation of zener diode 469.

Under normal power supply operating conditions, (no overvoltage condition) the voltage on the HV lead 82 is low enough to prevent zener diode 469 from conducting. Thus, the base of transistor 465 is at a negative value keeping that transistor turned off. Additionally, the voltage on the TO line 90 is also at a positive or binary 1 value during normal operation. Further, during normal power supply operation, the input voltage SO on conductor 46 is normally a low or binary 0 value. This keeps transistor 459 turned off so that its collector is at a binary 1.

NAND gates 458 and 456 form a latch circuit which operates as follows. Under normal operating conditions the RESET input signal on conductor 92 is normally a binary 1 as one input to NAND gate 456. When power is first applied to the power supply, if NAND gate 458 comes up in the enabled condition, its output on conductor 472 will go to a binary 0 state, thus disabling NAND gate 456. With NAND gate 456 disabled its output on conductor 473 will go to a binary 1 keeping NAND gate 458 in the enabled condition and latching NAND gates 458 and 456 in their present state. However, if NAND gate 458 comes up in the disabled state its output on conductor 472 will be a binary 1, thus enabling gate 456 to generate a binary 0 output signal on conductor 473 to latch the two NAND gates in that state. NAND gates 456 and 458 form a latch circuit to determine whether the output voltage VOP of the power supply is present when power is first turned on. The state of the latch gates 456 and 458 is controlled by the respective input signals to those gates (RESET and TO). How these two signals affect the latch circuit will be described in connection with the start up and turn off circuits 93 and 91 respectively. However, for the present, let it be assumed that power (VOP) is present at the output of the power supply and that NAND gate 456 is disabled and NAND gate 458 is enabled. With NAND gate 456 disabled a binary 1 latch signal on conductor 94 is provided to the start up circuit and a binary 1 signal CL on conductor 81 is provided to base driver circuit via a NAND gate inverter 463.

Let it now be assumed that the collector to emitter voltage on either half of the output power inverter 28 power driver transistors goes to a high voltage (e.g., 480 volts). When this occurs sufficient voltage is applied across the voltage divider network comprised of resistors 244 (FIG. 16) and 471 (FIG. 7). The voltage drop across resistor 471 is now sufficiently high to allow zener diode 469 to conduct causing the base of transistor 465 to go sufficiently positive to turn on. With transistor 465 now turned on, its collector and the input to NAND gate 458 will go to a binary 0 disabling gate 458. With gate 458 now disabled its output on conductor 472 will go to a binary 1 thus applying a binary 0 CL signal via NAND gate 463 to the base driver on conductor 81. Additionally, the binary 1 signal on conductor 472, in conjunction with the normally high RESET signal on conductor 92, causes NAND gate 456 to be enabled. The binary 0 output on conductor 473 from NAND gate 456 will now feedback to the input of NAND gate 458 latching the circuit in its present state. As previously described in connection with the base driver circuit, whenever the CL signal goes to a binary 0 the output power inverter is disabled or shut-off.

The output power inverter can also be shut-off by the high voltage limit shutoff latch of FIG. 7 by the SO signal on conductor 46 from the high voltage cutoff and isolator circuit 44. Under normal power supply operating conditions this input signal is low or binary 0. However, let it be assumed that a high voltage condition exists in the secondary circuit of transformer T1 or the crowbar circuit 40 has detected an overvoltage condition on the output of the rectifier. Whenever either of these conditions occurs, as detected by the high voltage cutoff and isolator circuit 44, the SO signal will go to a binary 1 turning transistor 459 on. When transistor 459 goes into conduction its collector will go to a binary 0 disabling NAND gate 458 in the manner as just described in connection with the operation of transistor 465. The power supply is shutdown by the binary 0 CL signal in the same manner as just described.

The high voltage shutoff latch circuit of FIG. 7, in response to a binary 0 signal TO on conductor 90 from the turn off circuit 91, can also turn inverter 28 off. The TO signal, under normal power supply operating conditions, is normally a binary 1 or high signal. However, as will subsequently be described, whenever the turnoff circuit 91 detects an overcurrent limit condition the TO signal will go to a binary 0, thus shutting off the power supply inverter as just described in connection with FIG. 7. This is accomplished, of course, by disabling NAND gate 458. The RESET signal on conductor 92 from the start up circuit 93 is utilized to control the state of the latch to generate the LATCH signal on conductor 94 during initial start up in the event that the power supply comes up in the off condition. How these two signals affect the operation of the power supply will become understood as the description proceeds in connection with the operation of the start up circuit 93.

Reference is now made to the start up circuit of FIG. 9. As previously mentioned the primary purpose of the start up circuit is to insure that the latch circuit in the high voltage limit shutoff latch 48 is placed in the proper condition to allow the power supply to be turned on in the event that the power supply comes up in the off condition. That is the output inverter 28 is not running. The start up circuit receives the ±5 volts from the internal power inverter 22 as bias voltages. Three resistors 475, 476 and 478 are connected in series between the ±5 volts to provide a voltage divider network for proper base bias for a transistor 479. The LATCH signal on conductor 94 from the high voltage limit shutoff latch 48 is provided to the base of transistor 479 through resistor 476. Collector voltage is provided to transistor 479 from the +5 volt bus via two resistors 480 and 481. A capacitor 482 connected between −5 volts, resistor 480 and the emitter terminal of a unijunction transistor 483 serves as a power source which is charged up to a predetermined level to cause transistor 483 to be turned on during start up circuit of operation. The top base lead of transistor 483 is connected to the +5 volt bus and the bottom base lead of that transistor is connected to the base of an NPN transistor 484 receiving its base bias voltage from a resistor 485 connected to the −5 volt bus. Collector voltage for transistor 484 is provided +5 volts through a resistor 486. The emitter of transistor 484 is connected to the −5 volt bus. A coupling resistor 487 is connected in series with two diodes 488 and 489 to couple the output of the collector of transistor 484 to the base of a second NPN transistor 490. Base bias voltage is provided to transistor 490 from the −5 volts through a resistor 491. Resistor 491 in conjunction with diodes 488, 489, resistors 487 and 486 serve to collectively provide the proper base bias voltage to transistor 490. A capacitor 492 is connected from the junction of resistor 487 and the anode of diode 486 to −5 volts. Capacitor 492 is discharged by the conduction of transistor 484.

When transistor 484 is turned off, or non-conducting, capacitor 492, through resistors 486 and 487 will charge in a positive direction to an amplitude sufficient to turn on transistor 490. Collector voltage is provided to transistor 490 from the +5 volts through a resistor 493. The output from the collector of transistor 490 is provided to two transistors. The first of these is a transistor 494 receiving its base input through a resistor 495. The second output from the collector of transistor 490 is to the base of a transistor 496 taken from the junction of two series connected resistors 497 and 498. Resistor 498 is connected to the −5 volt bus to provide bias voltage for transistor 496. Base bias voltage for transistor 494 is also provided by resistor 497 connected to the +5 volt bus via resistor 493.

Transistor 494 provides at its collector output terminal the RESET signal on conductor 92 to the high voltage limit shut-off latch circuit 48 of FIG. 7. As shown in FIG. 1 the inhibit signal on conductor 97 from the start up circuit 93 is provided to the turn off circuit 91. This signal is taken from the collector of transistor 496 and provided, via line 97, to a coupling resistor 498 in FIG. 10.

To understand the operation of the start up circuit of FIG. 9 it is necessary to simultaneously consider the high voltage limit shutoff latch circuit of FIG. 7. From the previous description of FIG. 7 it will be recalled that, if the power supply comes up in the off state the latch circuit (gates 456, 458 and 463 of FIG. 7) will be in a condition whereby the LATCH signal on conductor 94 is a binary 0. Referring now to FIG. 9, if the LATCH signal on conductor 94 is a binary 0, transistor 479 is turned off. With transistor 479 turned off capacitor 482 through resistor 480 will charge to a level sufficient to fire the unijunction transistor 483. When transistor 483 fires, a positive pulse will be developed across resistor 485 causing transistor 484 to turn on for the duration of that pulse. The duration of the pulse across resistor 485, of course, is determined by the off time of transistor 479. That is, when transistor 479 is driven into conduction, as will subsequently be described, capacitor 482 is rapidly discharged turning off the unijunction transistor 483 terminating the pulse across resistor 485. When transistor 484 conducts it will rapidly discharge capacitor 492, which was previously charged through resistors 487 and 486 when transistor 484 was turned off. Transistor 490, which is normally in the on state, will now be turned off by the negative going signal at its base input terminal. Transistor 490 will remain off until capacitor 492 recharges. Of course, transistor 492 cannot recharge until transistor 484 is turned off in the manner as previously described.

When transistor 490 is turned off a positive voltage is applied to the base of transistors 494 and 496 causing each of those transistors to go into conduction. When transistors 494 and 496 tun on a negative or binary 0 signal is generated at each of their collector outputs. The INHIBIT signal on conductor 97 is applied to the turn off circuit of FIG. 10 to inhibit operation of that circuit in a manner to subsequently be described. The binary 0 RESET signal on conductor 92 is now applied to NAND gate 456 of the high voltage shut-off latch circuit (FIG. 7). Referring to FIG. 7, it can be seen that when the RESET signal goes to a binary 0, gate 456 is disabled, causing the LATCH signal on conductor 94 to now achieve a binary 1 state. In FIG. 9 it can now be seen that the binary 1 LATCH signal will cause transistor 479 to go into conduction rapidly discharging capacitor 482 which in turn will turn off unijunction transistor 483. This results in now developing a negative pulse across resistor 485 to turn off transistor 484. With transistor 484 now turned off, capacitor 492 will begin to charge up to a positive value sufficient to turn transistor 490 back on. After this charge delay, transistor 490 will turn on applying a negative turn off signal to the base of each of the transistors 494 and 496. When transistors 494 and 496 each turn off a positive binary 1 signal is now applied on line 97 to the turn off circuit and to NAND gate 456 on the reset line 92.

Referring to FIG. 7 it can now be understood how the latch circuit will be latched in the proper state to allow the power supply to be turned on. The binary 1 signal from NAND gate 456 which is fed back to the input of NAND gate 458 will cause that latter gate to be enabled. With NAND gate 458 now enabled its output on conductor 472 is a binary 0, thus disabling gate 456 to keep the LATCH signal on conductor 94 positive. With the latch signal positive during normal power supply operation transistor 479 is continuously conducting, thus the circuit can no longer generate an output pulse until the latch signal again goes negative.

Reference is now made to the turn off circuit of FIG. 10. This circuit is connected to the −5 volt and HCOM busses which serve to provide bias voltage for a NAND gate inverter 500 and an NPN transistor 502. A pull up resistor 504 is connected to the output of gate 500 and to the HCOM bus. The output of gate inverter 500 is provided to the base of transistor 502 via two series connected diodes 506 and 508. Base bias voltage is provided to transistor 502 from the −5 volts through a resistor 510. The output of the turn off circuit is taken on conductor 90 from the collector of transistor 502 as the TO signal, the generation of which will subsequently be described. An integrating capacitor 512 is connected between the junction of diodes 506 and 508 and the −5 volt bus. The INHIBIT signal from the start up circuit of FIG. 9 is also provided to this junction via resistor 498.

During normal power supply operation the CLF signal on conductor 95 from the fast current limit circuit 36 (FIG. 1) is high or a binary 1. Thus, the output of NAND inverter 500 is a binary 0 keeping capacitor 512 discharged through back biased diode 506.

Digressing temporarily back to the previous description of the fast current limit circuit 36, it will be recalled that the CLF output signal on conductor 80 is utilized to instantaneously turn off the output power inverter 28 via the base driver circuit 72 whenever excessive current flows in the primary of transformer T1. However, in the event of a short circuit or over current condition, it is possible that the power supply may remain in the fast current limit condition for a sustained period. Should this happen, it is desirable to turn the power supply back on because the limit condition may only be temporary. The turn off circuit serves this function of guaranteeing that the power supply will turn back on in the event that the CLF signal is present at the input of inverter 500 of FIG. 10 for a sustained period.

Assume now that the CLF signal goes negative to a binary 0. Inverter 500 will now generate a binary 1 output signal which will forward bias diode 506 causing capacitor 512 to begin to charge toward that value of the binary 1 signal. When the time integral of the CLF signal on conductor 95 achieves a defined value equivalent to a specified time (for example, approximately 200 milliseconds), capacitor 512 will charge sufficiently positive to forward bias diode 508 turning on transistor 502. When transistor 502 conducts the turn off signal TO on conductor 90 to the high voltage limit shut-off latch circuit (FIG. 7) will go to a binary 0. Referring now to FIG. 7, the TO signal is applied to NAND gate 458 of the latch circuit disabling that gate and causing its output to go to a binary 1. Since the RESET signal is normally a binary 1, NAND gate 456 will now be enabled to generate a binary 0 output LATCH signal on conductor 94 to turn off transistor 479 in the start up circuit of FIG. 9. The start up circuit of FIG. 9 will now operate in the manner as previously described whereby capacitor 482 will begin to charge to the firing level of unijunction transistor 483. As previously described this results in the generation of the two binary 0 gate signals (RESET and INHIBIT) on conductors 92 and 97 respectively. In FIG. 7 it can be seen that the negative going RESET gate signal will now disable NAND gate 456 causing the LATCH signal on conductor 94 to again go to a binary 1 causing transistor 479 of the start up circuit to conduct discharging capacitor 482 as previously described.

Referring to FIGS. 9 and 10, the negative going binary 0 INHIBIT signal is applied to the junction of diodes 506 and 508. This binary 0 signal will now rapidly discharge capacitor 512 and turn off transistor 502 inhibiting that circuits operation and allowing the turn off signal TO to achieve a binary 1 to enable NAND gate 458 in FIG. 7. It can now be seen that the latch circuit of FIG. 7 is latched in the set or start up state allowing the power supply to turn on. This, of course, is caused by the output of NAND gate 463 of FIG. 7 providing a binary 1 CL signal on conductor 81 to the base driver circuit 72 causing that circuit to turn on the output power inverter.

After the power supply is turned back on, if the current limit persists the latch circuit in FIG. 7 will again be reset by the binary 0 TO pulse on conductor 90. This will again turn off the output power inverter via the base driver circuit 72 as a result of the CL signal going to a binary 0 and simultaneously activate the start up circuit of FIG. 9 to turn the power supply on again as previously described. So long as the over current condition exists (CLF = binary 0) in the power supply, the turn off circuit, the start up circuit, and the high voltage shut-off latch circuit will continue to cause a cycling on and off of the power supply in a current limit mode to control the output current of the power supply until the overcurrent condition is removed.

The frequency with which the power supply is turned back on during current limit cycling is controlled by the start up circuit of FIG. 9. The primary control for controlling the turn off time of the power supply is a function of the time integral of the current limit signal (CLF) achieving a defined value to charge capacitor 512 of FIG. 10. The RC time constant comprised of resistors 486, 487 and capacitor 492 of FIG. 9 will cause the RESET and INHIBIT signals to appear approximately once every second to cycle the power supply on.

Referring back to FIG. 7 it is also significant to note that the power supply will go through the same cycling operation in the event of a shutoff signal on conductor 46 from the high voltage cutoff and isolator or the high voltage signal HV on conductor 82 from the output power inverter. Thus, it can be seen that the combination of the high voltage limit shutoff latch of FIG. 7, the start up circuit of FIG. 9, and the turnoff circuit of FIG. 10 are utilized to turn off the power supply under any and all high voltage or overcurrent conditions, and to cause the power supply to cycle in a current limit condition so long as either an overcurrent or a high voltage condition exists.

With the preceding background of the operation of the power supply the timing diagrams of FIGS. 18 and 19 can now be readily understood. These two timing diagrams show the timing relationships between the major signals generated by the power supply under four different operating conditions.

Referring now specifically to FIG. 18 in conjunction with FIG. 1 there are shown the waveshapes of the major signals BLANK, $\overline{BLANK}$, LOGA, LOGB, FBK, the sawtooth wave at TP2 of circuit 78, the FB signal and the B1 and B2 signals. The left portion of FIG. 18 shows the timing relationships of the various signals to generate the FB and B1 and B2 signals, the latter controlling the output power of inverter 28 when the output voltage VOP is less than the reference voltage REF. Under these conditions, as explained at the top of FIG. 18, the feedback signal FBK on conductor 60 is at its maximum value as exemplified by +4 volts to alter the pulse width of the FB signal to cause the output power inverter to remain on for a longer period of time to increase the output voltage VOP.

The right hand portion of FIG. 18 illustrates how the output voltage VOP is approximately equal to the reference voltage REF. When VOP is equal to or approximately equal to REF the feedback signal FBK goes in a negative direction toward −3 volts as shown adjacent the break lines. As can be seen the FBK signal will now cause the pulse width modulated signal FB to alternate with a shorter on period and longer off period than that shown in the left portion of the timing diagram. The right portion of the diagram shows in exemplary form the nominal operating condition of the power supply, whereby the FBK signal is minimum to hold the output voltage VOP constant.

The timing diagram of FIG. 19 shows the timing relationships between the previously mentioned major signals of FIG. 18 in addition to the current limit regulator signal CLR, the T1 and IACT current signals and the IREF voltage or current. In the left portion of the timing diagram it will be noted that the FB, B1, and B2 signals appear substantially the same as shown in the right hand portion of FIG. 18. The left portion of FIG. 19 is shown merely to indicate what the CLR signal and the T1 current signal look like during normal operation of the power supply. That is, when the T1 current is less than the IREF signal and the output voltage VOP is approximately equal to or equal to the REF voltage.

The power supply waveforms will take on the representative form as shown in the right hand portion of FIG. 19 if an overload condition or malfunction should occur causing the T1 primary current to become excessive. Adjacent to the break lines the CLR signal on line 86 of the current limit regulator is shown degenerating or integrating toward a negative value of −3 volts. As can be seen this alters the pulse width modulated signal FB causing the inverter to turn on for a very short period of time and turn off for a relatively long period of time. This has the effect of decreasing the output voltage of the output power converter while simultaneously controlling the T1 current approximately equal to the IREF level as shown at the bottom of FIG. 19 whereby the IACT, the actual primary current, is equal to the IREF current.

While the circuits utilized to implement the present invention in its preferred embodiment are believed shown and described in sufficient detail to enable one skilled in the art to practice the present invention, it is noted that certain elements are illustrated only as a block with a descriptive label and/or reference character designation. These elements are standard commercially available items, mostly in the form of integrated circuit chips, and the following tabulation giving a more complete identification and source of additional information is provided in the interest of complete and full disclosure. In this tabulation, abbreviations will be used as follows:

| Companies | |
|---|---|
| NS | — National Semiconductor Corporation |
| TI | — Texas Instruments, Inc. |
| RCA | — RCA Corporation |
| Fairchild | — Fairchild Semiconductor Components Group |
| Literature | |
| NS-LIC | — "National Semi-conductor-Linear Integrated Circuits"-Copyright 1973. |
| RCA Databook | — "RCA Solid State Databook Series COS/MOS Digital Integrated Circuits"-Copyright 1972. |
| TTL Databook | — "Texas Instruments, Inc. - The TTL Databook" Copyright 1973. |
| Fairchild Catalog | — "Fairchild Semiconductor-Linear Integrated Circuits Data Catalog"-Copyright 1973 |

| FIG. | Element | Mfg'r. | Part No. | Literature Reference |
|---|---|---|---|---|
| 3 | Flog | TI | 74H102 | TTL Databook |
| 4 | Comparator 425 | NS | LM311 | NS-LIC |
| 5 | Switch 442 | RCA | CD4016AD | RCA Databook |
| 5 | OP.Int. 450 | NS | LM308 | NS-LIC |
| 6 | Comparator 393 | NS | LM311 | NS-LIC |
| 11 | 300 | Fairchild | u723 | Fairchild Cat. |
| 12 | Voltage Comparators 325 & 326 | NS | LM311 | NS-LIC |
| 13 | Comparator 286 | NS | LM311 | NS-LIC |

While the invention has been explained and described with the aid of the particular embodiment shown, it will be understood that the invention is not to be limited thereby and that many modifications retaining and utilizing the spirit of the invention will occur to those skilled in the art. It is, therefore, contemplated by the appended claims to cover all such modifications as fall within the spirit and scope of the invention.

What is claimed is:

1. A power conversion system of the inverter type for supplying electrical power from a source to a load comprising:
   a. a controllable power inverter having a primary circuit connectable to the source and a secondary circuit coupled to said primary circuit for supplying controlled power to the load;
   b. switching means for controlling the percentage of time that said primary circuit is connected to the source; and,
   c. means for limiting the current in said primary circuit including:
      1. means to provide a monitor signal proportional to the instantaneous value of the current in said primary circuit,
      2. first limit means responsive to said monitor signal to substantially instantaneously effect an inhibiting of the connection of said primary circuit to the source when said monitor signal exceeds a predetermined value, and
      3. second limit means responsive to said monitor signal to effect, for a specified period of time, a further inhibiting of the connection of said primary circuit to the source when the time integral, of the monitor signal exceeding the predetermined value, reaches a defined value.

2. The invention in accordance with claim 1 wherein said switching means is responsive to drive signals and further including drive means for generating said drive signals.

3. The invention in accordance with claim 2 wherein said first and second limit means each provide control signals to said drive means to thereby inhibit the connection of said primary circuit to the source.

4. The invention in accordance with claim 1 wherein said second limit means comprises:
   a. means to develop a first signal when said integral of said monitor signal reaches the defined value,
   b. means responsive to said first signal to generate a second signal operable to effect the inhibiting of the connection of said primary circuit to the source, and
   c. means to discontinue said second signal after said specified period of time.

5. The invention in accordance with claim 4 wherein said switching means is responsive to drive signals and further including drive means for generating said drive signals and wherein said second signal acts as a control signal to said drive means to inhibit the connection of said primary circuit to the source.

6. The invention in accordance with claim 4 wherein said second signal is repetitively generated so long as said time integral of said monitor signal remains greater than said defined value.

7. A power conversion system of the type for supplying electrical power from a source to a load comprising:
   a. a controllable power inverter having a primary circuit connectable to the source and a secondary circuit coupled to said primary circuit for supplying controlled power to the load;
   b. switching means responsive to drive signals for controlling the percentage of time that said primary circuit is connected to the source;
   c. limit means including sensing means for substantially instantaneously providing a limit signal when the current in said primary circuit achieves a predetermined value;

d. drive means providing said drive signals to said switching means and responsive to said limit signal to effect an inhibiting of said drive signals to inhibit the connection of said primary circuit to the source when the primary circuit current exceeds the predetermined value;

e. shut-off means responsive to said limit signal for providing a control signal to said drive means to further effect an inhibiting of said drive signals when the time integral of said limit signal reaches a defined value; and f. turn on means responsive to the generation of said control signal of said shut-off means to provide a signal to said shut-off means after a specified period of time to remove said control signal to thereby permit a connection of the primary circuit to the source.

8. The invention in accordance with claim 7 wherein said shut-off means includes, a. integrating means for generating a turn-off signal in response to the time integral of said limit signal reaching the defined value and latch means responsive to said turn-off signal for generating said control signal.

9. The invention in accordance with claim 8 wherein said latch means includes means for providing a latch signal representative of the generation of said control signal to said turn-on means and means responsive to the signal from said turn-on means to remove said control signal from said drive means.

10. The invention in accordance with claim 9 wherein said turn-on means includes delay means for delaying said latch signal for said specified period of time to develop the signal to said latch means to effect the removal of said control signal.

11. A power conversion system of the inverter type for supplying electrical power from a source to a load comprising:

a. a controllable power inverter having a primary circuit connected to the source and a secondary circuit coupled to said primary circuit for supplying controlled power to the load;

b. switching means for controlling the percentage of time that said primary circuit is connected to the source; and, c. means for limiting the current in said primary circuit including,
 1. means to provide a monitor signal proportional to the instantaneous value of the current in said primary circuit,
 2. first limit means including a comparator means responsive to the value of the monitor signal to substantially instantaneously generate a control signal having a pulse duration substantially equal to the time that the primary circuit current is greater than a predetermined value to effect an inhibiting of the connection of said primary circuit to the source; and, d. second limit means including integrating means responsive to said control signal to effect, for a specified period of time, a further inhibiting of the connection of said primary circuit to the source when the time integral of the control signal reaches a defined value.

12. The invention in accordance with claim 11 further including a source of clock signals and wherein said first limit means further includes latch means connected to said comparator means and said switching means for providing said control signal to the latter means, said latch means capable of achieving first and second states in response to said control signal and said clock signals, said latch means achieving said first state in response to said control signal when the primary circuit current exceeds said predetermined value to effect the inhibiting of the connection of said primary circuit to the source and achieving said second state in response to a one of said clock signals when the magnitude of the primary circuit current becomes less than said predetermined value to thereby effect a connection of said primary circuit to the source.

13. The invention in accordance with claim 12 wherein said integrating means includes means to enable said control signal to be applied thereto only during those periods that said latch means is in said first state.

* * * * *